(12) United States Patent
Hashimoto et al.

(10) Patent No.: US 10,274,851 B2
(45) Date of Patent: Apr. 30, 2019

(54) TONER

(71) Applicant: CANON KABUSHIKI KAISHA, Tokyo (JP)

(72) Inventors: Takeshi Hashimoto, Moriya (JP); Masayuki Hama, Toride (JP); Yuto Onozaki, Saitama (JP); Ichiro Kanno, Kashiwa (JP); Nozomu Komatsu, Toride (JP); Hiroyuki Fujikawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/886,965

(22) Filed: Feb. 2, 2018

(65) Prior Publication Data
US 2018/0246431 A1   Aug. 30, 2018

(30) Foreign Application Priority Data

Feb. 28, 2017 (JP) ................. 2017-035985

(51) Int. Cl.
| G03G 9/08 | (2006.01) |
| G03G 9/087 | (2006.01) |
| C01G 23/00 | (2006.01) |
| C01G 23/047 | (2006.01) |

(52) U.S. Cl.
CPC ........ G03G 9/0825 (2013.01); C01G 23/005 (2013.01); C01G 23/006 (2013.01); C01G 23/047 (2013.01); G03G 9/0819 (2013.01); G03G 9/0827 (2013.01); G03G 9/08755 (2013.01); C01P 2004/51 (2013.01); C01P 2004/64 (2013.01)

(58) Field of Classification Search
CPC ................................. G03G 9/09708
See application file for complete search history.

(56) References Cited

U.S. PATENT DOCUMENTS

| 5,968,701 | A | 10/1999 | Onuma et al. |
| 6,020,102 | A | 2/2000 | Fujimoto et al. |
| 6,120,961 | A | 9/2000 | Tanikawa et al. |
| 6,156,471 | A | 12/2000 | Kobori et al. |
| 6,203,959 | B1 | 3/2001 | Tanikawa et al. |
| 6,235,441 | B1 | 5/2001 | Tanikawa et al. |
| 6,430,384 | B2 | 8/2002 | Hama et al. |
| 6,500,594 | B2 * | 12/2002 | Hamano ............ G03G 9/08755 430/109.4 |
| 6,653,036 | B1 | 11/2003 | Tanikawa et al. |
| 6,670,087 | B2 | 12/2003 | Fujikawa et al. |
| 6,751,424 | B2 | 6/2004 | Komatsu et al. |
| 6,808,852 | B2 | 10/2004 | Hotta et al. |
| 7,112,395 | B2 | 9/2006 | Ida et al. |
| 7,135,263 | B2 | 11/2006 | Kawakami et al. |
| 7,147,980 | B2 | 12/2006 | Itakura et al. |
| 7,147,981 | B2 | 12/2006 | Fujikawa et al. |
| 7,279,262 | B2 | 10/2007 | Fujikawa et al. |
| 7,288,348 | B2 | 10/2007 | Hayami et al. |
| 7,297,455 | B2 | 11/2007 | Fujikawa et al. |
| 7,300,733 | B2 | 11/2007 | Sugahara et al. |
| 7,361,441 | B2 | 4/2008 | Itakura et al. |
| 7,396,626 | B2 | 7/2008 | Fujikawa et al. |
| 7,396,629 | B2 | 7/2008 | Baba et al. |
| 7,442,478 | B2 | 10/2008 | Itakura et al. |
| 7,452,647 | B2 | 11/2008 | Hayami et al. |
| 7,611,813 | B2 | 11/2009 | Ida et al. |
| 7,858,283 | B2 | 12/2010 | Ishigami et al. |
| 7,927,775 | B2 | 4/2011 | Komatsu et al. |
| 7,939,233 | B2 | 5/2011 | Inoue et al. |
| 8,137,886 | B2 | 3/2012 | Baba et al. |
| 8,142,972 | B2 | 3/2012 | Hotta et al. |
| 8,288,069 | B2 | 10/2012 | Fujikawa et al. |
| 8,921,023 | B2 | 12/2014 | Baba et al. |
| 8,927,188 | B2 | 1/2015 | Naka et al. |
| 8,986,914 | B2 | 3/2015 | Fujikawa et al. |
| 9,034,549 | B2 | 5/2015 | Shiotari et al. |
| 9,058,924 | B2 | 6/2015 | Komatsu et al. |
| 9,063,443 | B2 | 6/2015 | Ishigami et al. |
| 9,152,088 | B1 | 10/2015 | Kobori et al. |
| 9,348,253 | B2 | 5/2016 | Kanno et al. |
| 9,417,540 | B2 | 8/2016 | Hashimoto et al. |
| 9,500,975 | B2 | 11/2016 | Sugahara et al. |
| 9,594,323 | B2 | 3/2017 | Fujikawa et al. |
| 9,599,920 | B2 | 3/2017 | Sugahara et al. |
| 9,651,883 | B2 | 5/2017 | Hama et al. |
| 9,665,023 | B2 | 5/2017 | Kamae et al. |

(Continued)

FOREIGN PATENT DOCUMENTS

| JP | H05-058633 A | 3/1993 |
| JP | 2015-137208 A | 7/2015 |

OTHER PUBLICATIONS

U.S. Appl. No. 15/813,713, Yuto Onozaki, filed Nov. 15, 2017.
U.S. Appl. No. 15/807,766, Yuto Onozaki, filed Nov. 9, 2017.
U.S. Appl. No. 15/912,698, Hitoshi Sano, filed Mar. 6, 2018.

*Primary Examiner* — Peter L Vajda
(74) *Attorney, Agent, or Firm* — Venable LLP

(57) ABSTRACT

A toner is provided, which contains a toner particle and a metal titanate particle, wherein, in a number-based particle size distribution of the metal titanate particle on the surface of the toner particle, when D10, D50 and D90 denote the particle diameter at which the cumulative value from the small particle diameter side reaches 10% by number, 50% by number and 90% by number, respectively, the D50 is at least 10 nm and not more than 90 nm, and the particle size distribution index A, which is represented by D90/D10, is at least 2.00 and not more than 10.00, and the value of storage elastic modulus G' at 40° C. in viscoelasticity measurements of the toner is at least $1.0 \times 10^7$ Pa and not more than $1.0 \times 10^{10}$ Pa.

13 Claims, No Drawings

(56) References Cited

U.S. PATENT DOCUMENTS

| | | |
|---|---|---|
| 9,665,026 B2 | 5/2017 | Iwasaki et al. |
| 9,778,598 B2 | 10/2017 | Onozaki et al. |
| 2009/0246675 A1 | 10/2009 | Nakamura et al. |
| 2010/0028796 A1 | 2/2010 | Nakamura et al. |
| 2010/0183971 A1 | 7/2010 | Fujikawa et al. |
| 2010/0304288 A1* | 12/2010 | Anno ................. G03G 9/09708 430/108.6 |
| 2013/0244159 A1 | 9/2013 | Ishigami et al. |
| 2013/0252167 A1* | 9/2013 | Moribe .............. G03G 9/08702 430/109.4 |
| 2014/0134535 A1 | 5/2014 | Baba et al. |
| 2014/0178100 A1* | 6/2014 | Takahashi .......... G03G 15/0813 399/159 |
| 2014/0329176 A1 | 11/2014 | Kanno et al. |
| 2014/0377696 A1* | 12/2014 | Hasegawa ................ G03G 9/08 430/108.3 |
| 2016/0109820 A1 | 4/2016 | Hashimoto et al. |
| 2016/0306301 A1 | 10/2016 | Sugahara et al. |
| 2016/0363877 A1 | 12/2016 | Hama et al. |
| 2017/0315461 A1 | 11/2017 | Komatsu et al. |
| 2017/0315463 A1 | 11/2017 | Onozaki et al. |
| 2017/0343911 A1 | 11/2017 | Hashimoto et al. |
| 2017/0357168 A1 | 12/2017 | Kanno et al. |

\* cited by examiner

TONER

BACKGROUND OF THE INVENTION

Field of the Invention

The present invention relates to a toner that can be used in electrophotography systems, electrostatic recording systems, electrostatic printing systems and toner jet systems.

Description of the Related Art

As use of copiers and printers has become more widespread, higher performance has been required of toners. In addition to reducing energy consumption, attention has been focused in recent years on digital printing techniques known as print on demand (POD), in which printing is directly carried out without the use of a plate-making process.

This print on demand (POD) can be used for small batch printing, printing of materials whose content varies from print to print (variable printing) and distributed printing, and therefore has advantages over conventional offset printing. In cases where image formation methods involving the use of toners are to be considered for use in the POD market, it would be necessary to stably obtain prints with high image quality even in cases where large amounts of printed materials are outputted at high speed for long periods of time.

Even in cases where large amounts of printed materials are outputted at high speed for long periods of time, in order to obtain prints with high image quality, there is a strong need for a toner that undergoes little change in charging performance, transferability and developer flowability.

Reasons why these properties change include changes in toner properties caused by external additives becoming embedded in the surface of toner particles when printing is carried out for long periods of time and changes in temperature and humidity inside the main body of a copier. As a result, there is a need for external additives which are unlikely to become embedded in the surface of toner particles when printing is carried out for long periods of time and which undergo little change in properties according to temperature and humidity.

As a result, there have been a variety of investigations into external additives having compositions that are different from silica particles that had come to be used in the past as external additives. In particular, strontium titanate particles are materials that have attracted attention due to be greatly different from silica particles in terms of crystal structure, shape and charging performance.

Japanese Patent Application Publication No. 2015-137208 proposes a toner that contains, as an external additive, strontium titanate fine particles which have a cubic or rectangular parallelepiped shape, have a $SrO/TiO_2$ molar ratio of at least 0.80 and less than 0.95, and have a narrow primary particle size distribution.

In addition, Japanese Patent Application Publication No. H05-58633 discloses a method for producing a strontium titanate compound having an average particle diameter of at least 0.1 μm, the method being characterized by subjecting a titanium compound hydrolyzate and a strontium compound to a wet reaction in the presence of hydrogen peroxide.

SUMMARY OF THE INVENTION

In cases where the strontium titanate particles proposed in Japanese Patent Application Publication No. 2015-137208 were used as an external additive for a toner, initial charging performance, transferability and environmental stability were good, but after printing for long periods of time, image density and image uniformity decreased as a result of decreased charging performance and transferability. In addition, environmental stability also decreased. These tendencies were particularly pronounced when printing images having low print coverage rates.

The purpose of the present invention is to solve these problems.

That is, the present invention provides a toner which exhibits excellent low-temperature fixability, shows little decrease in print density and print uniformity even when printing images having low print coverage rates for long periods of time, and exhibits excellent environmental stability.

The present invention is
a toner containing a toner particle and a metal titanate particle, wherein
in a number-based particle size distribution of the metal titanate particle on the surface of the toner particle,
when
D10 denotes the particle diameter at which the cumulative value from the small particle diameter side reaches 10% by number,
D50 denotes the particle diameter at which the cumulative value from the small particle diameter side reaches 50% by number, and
D90 denotes the particle diameter at which the cumulative value from the small particle diameter side reaches 90% by number,
the D50 is at least 10 nm and not more than 90 nm, and
the particle size distribution index A, which is represented by the ratio of the D90 to the D10 (D90/D10), is at least 2.00 and not more than 10.00, and
the value of storage elastic modulus G' at 40° C. in viscoelasticity measurements of the toner is at least $1.0 \times 10^7$ Pa and not more than $1.0 \times 10^{10}$ Pa.

Further features of the present invention will become apparent from the following description of exemplary embodiments.

DESCRIPTION OF THE EMBODIMENTS

In the present invention, numerical ranges shown as "at least OO and not more than XX" and "OO-XX" mean numerical ranges that include the upper and lower limits, unless explicitly stated otherwise.

The toner of the present invention contains a toner particle and a metal titanate particle, wherein in a number-based particle size distribution of the metal titanate particle on the surface of the toner particle,
when
D10 denotes the particle diameter at which the cumulative value from the small particle diameter side reaches 10% by number,
D50 denotes the particle diameter at which the cumulative value from the small particle diameter side reaches 50% by number, and
D90 denotes the particle diameter at which the cumulative value from the small particle diameter side reaches 90% by number,
the D50 is at least 10 nm and not more than 90 nm, and
the particle size distribution index A, which is represented by the ratio of the D90 to the D10 (D90/D10), is at least 2.00 and not more than 10.00, and the value of storage elastic modulus G' at 40° C. in viscoelasticity measurements of the toner is at least $1.0 \times 10^7$ Pa and not more than $1.0 \times 10^{10}$ Pa.

The reason why the toner of the present disclosure can solve the problems mentioned above is surmised by the inventors of the present invention to be as follows.

The strontium titanate particles disclosed in Japanese Patent Application Publication No. 2015-137208 undergo less change in terms of charging performance, transferability and environmental characteristics than silica particles. This tendency is particularly pronounced if the diameter of primary particles is not more than 90 nm, and these strontium titanate particles are effective for satisfying toner characteristics required for POD printing in recent years.

However, when printing is carried out for long periods of time, toners are subjected to high stresses, added strontium titanate particles become embedded in the surface of toner particles, and it can be difficult to maintain initial characteristics. As a result, toner characteristics deteriorate compared to when the toner is initially used. This tendency is pronounced when printing at low print coverage rates.

There has been a tendency in recent years for toners having lower viscosities to be produced from the perspective of saving energy, and there has been a tendency for metal titanate particles to become embedded more easily than in the past when printing is carried out for long periods of time.

In order to increase the durability of a toner even when the toner is subjected to high stresses, it is essential to prevent metal titanate particles used as external additives from being embedded in the surface of toner particles.

Metal titanate particles used in the toner of the present invention are characterized by having a broader number-based particle size distribution than metal titanate particles that have come to be used in conventional toners.

In the present invention, the term "particle size distribution" means a number-based particle size distribution, unless explicitly stated otherwise.

If the particle size distribution is narrow, the heights of metal titanate particles protruding from the surface of toner particles are approximately the same. Therefore, in cases where the toner is subjected to stresses in a developing device or the like, the metal titanate particles on the surface of the toner particles are all subjected to similar loads, meaning that the metal titanate particles are embedded in the toner particles at similar speeds.

Therefore, once a certain period of time has passed, all the metal titanate particles become embedded at a depth whereby advantageous effects relating to charging performance and transferability cannot be achieved and charging performance and transferability decrease after printing is carried out for a long period of time.

However, if the particle size distribution is broad, there is a degree of variation in terms of the heights of the metal titanate particles protruding from the surface of the toner particles. In the initial printing stage, only metal titanate particles on a higher side (on the high particle diameter side) are subjected to stresses, meaning that metal titanate particles on a lower side (on the low particle diameter side) can be present in an unstressed state.

In other words, because there is a difference in terms of timing at which the metal titanate particles become embedded in the toner particles as printing progresses over a long period of time, it is possible to maintain advantageous effects relating to charging performance and transferability over a long period of time and it is possible to prevent a deterioration in image density and image uniformity.

Meanwhile, the storage elastic modulus G' at 40° C. in viscoelasticity measurements of the toner is at least $1.0 \times 10^7$ Pa and not more than $1.0 \times 10^{10}$ Pa. In addition, it is preferable for the storage elastic modulus to be at least $5.0 \times 10^7$ Pa and not more than $3.0 \times 10^9$ Pa.

Investigations by the inventors of the present invention have clarified a correlation between the ease with which metal titanate particles on the surface of toner particles are embedded in the toner particles and the storage elastic modulus G' of the toner between normal temperature and approximately 40° C.

It is surmised that this may be due to a correspondence between the temperature inside a developing device rising to approximately 40° C. and the degree of restorative force due to the elasticity of the toner when metal titanate particles on the surface of toner particles are subjected to external stresses.

In cases where the storage elastic modulus G' falls within the range mentioned above, toner particles can maintain charging performance even after printing for long periods of time as a result of the metal titanate particles having a broad particle size distribution while exhibiting excellent low-temperature fixability.

In cases where the storage elastic modulus G' is less than $1.0 \times 10^7$ Pa, the toner particles exhibit low elasticity, meaning that metal titanate particles are rapidly embedded even if the metal titanate particles have a broad particle size distribution. As a result, it is not possible to prevent embedding of the metal titanate particles when printing for long periods of time, and charging performance and transferability decrease, meaning that image density and image uniformity decrease.

Meanwhile, in cases where the storage elastic modulus G' exceeds $1.0 \times 10^{10}$ Pa, embedding of metal titanate particles does not occur, but low-temperature fixability decreases.

Examples of factors for controlling the storage elastic modulus G' within the range mentioned above include the type, glass transition temperature (Tg) and softening point (Tm) of a binder resin; the melting point and content of a wax; and the type and content of external additives present on the surface of toner particles. By adjusting these factors as appropriate, it is possible to control the storage elastic modulus G' within the range mentioned above.

In addition, in viscoelasticity measurements of the toner, it is preferable for the loss tangent (tan δ) to have a peak within the range of at least 40.0° C. and not more than 80.0° C., more preferably within the range of at least 45.0° C. and not more than 75.0° C., and further preferably within the range of at least 45.0° C. and not more than 70.0° C.

In cases where the loss tangent (tan δ) has a peak within the temperature range mentioned above, it is possible to obtain a toner that exhibits both low-temperature fixability and heat-resistant storage stability.

The loss tangent (tan δ) can be adjusted so as to have a peak within the range mentioned above by altering, for example, the type, glass transition temperature (Tg) and softening point (Tm) of a binder resin; the melting point and content of a wax; and the type and content of external additives present on the surface of toner particles.

The metal titanate particles have a ternary composition, have a crystal structure that is not present in silica particles used in external additives for toners, and exhibit excellent charging performance. The metal titanate particles exhibit resistance characteristics that leak excessive charge in low humidity environments in particular, and can stabilize charging performance regardless of environment.

Examples of the metal titanate particles include alkaline earth metal titanate particles such as strontium titanate particles, calcium titanate particles and magnesium titanate particles; and alkali metal titanate particles such as potassium titanate particles.

Of these, strontium titanate particles, calcium titanate particles and magnesium titanate particles having perovskite crystal structures are preferred from the perspective of stabilizing charging performance in a variety of environments, and strontium titanate particles are more preferred.

Here, in a number-based particle size distribution of the metal titanate particles on the surface of toner particles, D10 is defined as the particle diameter at which the cumulative value from the small particle diameter side reaches 10% by number, D50 is defined as the particle diameter at which the cumulative value from the small particle diameter side reaches 50% by number, and D90 is defined as the particle diameter at which the cumulative value from the small particle diameter side reaches 90% by number.

The D50 value of the metal titanate particles is at least 10 nm and not more than 90 nm. In addition, it is preferable for the D50 value to be at least 25 nm and not more than 80 nm.

Because it is important for there to be a degree of variation in terms of the heights of the metal titanate particles on the surface of the toner particles, as mentioned above, the particle size distribution of the metal titanate particles is calculated on the basis of secondary particles including aggregates, not on the basis of primary particles.

If the D50 value falls within the range mentioned above, charging performance and environmental stability can be effectively exhibited.

If the D50 value is less than 10 nm, the metal titanate particles are difficult to handle and it is not easy to form a toner.

If the D50 value exceeds 90 nm, the specific surface area per particle decreases, meaning that the area for leaking excessive charge in low humidity environments decreases. As a result, charging performance and environmental stability decrease.

The particle size distribution index A, which is represented by the ratio of D90 to D10 (D90/D10), of the metal titanate particles is at least 2.00 and not more than 10.00. In addition, this (D90/D10) ratio is preferably at least 2.00 and not more than 5.00, and more preferably at least 2.20 and not more than 3.00.

In cases where the particle size distribution index A represented by (D90/D10) is less than 2.00, the heights of metal titanate particles protruding from the surface of toner particles are approximately the same, image density and image uniformity decrease as a result of decreased charging performance and transferability following printing for long periods of time, and environmental stability also decreases.

In cases where the particle size distribution index A exceeds 10.0, charging performance and environmental stability decrease, although detailed reasons for this are unclear.

In addition, the particle size distribution index B, which is represented by the ratio of D90 to D50 (D90/D50), is preferably at least 1.50 and not more than 5.00, and more preferably at least 1.50 and not more than 3.50. In cases where the value of the particle size distribution index B is high, this shows that the particle size distribution is broader on the large particle diameter side.

If the particle size distribution index B falls within the range mentioned above, charging performance and environmental stability in high temperature and high humidity environments are further improved.

Factors that control the D50 value, the particle size distribution index A and the particle size distribution index B include the primary particle diameter and particle size distribution when the metal titanate particles are produced, and the type, added amount and external addition conditions of a surface treatment agent.

The average circularity of metal titanate particles on the surface of toner particles is preferably at least 0.650 and not more than 0.900, and more preferably at least 0.700 and not more than 0.850.

In addition, in a circularity distribution of the metal titanate particles, the proportion of particles having a circularity of at least 0.90 is preferably not more than 15% (and more preferably not more than 12%), and the proportion of particles having a circularity of not more than 0.60 is preferably not more than 10% (and more preferably not more than 8%).

In cases where the average circularity and circularity distribution of the metal titanate particles fall within the ranges mentioned above, it is possible to further prevent embedding of external additives after printing for long periods of time.

In cases where the average circularity is less than 0.650 and in cases where the proportion of particles having a circularity of not more than 0.60 exceeds 10%, the proportion of metal titanate particles having indefinite shapes is high. In such cases, the dispersibility of metal titanate particles on the surface of toner particles tends to decrease.

Meanwhile, in cases where the average circularity exceeds 0.900, the proportion of spherical metal titanate particles is high. If the shape of the particles approaches a spherical shape, stresses and loads to which the metal titanate particles are subjected are received by a small area of the toner particles when printing is carried out for a long period of time, meaning that external additives are readily embedded.

The average circularity and circularity distribution of the metal titanate particles can be adjusted within the ranges mentioned above by adjusting, for example, the mixing proportions of a titanium oxide source and sources of metals other than titanium when producing metal titanate particles by means of the normal pressure thermal reaction method described later, and the reaction temperature and time when adding an aqueous alkaline solution.

Moreover, the average circularity and circularity distribution of the metal titanate particles are calculated on the basis of secondary particles including aggregates, not on the basis of primary particles.

The coverage ratio of the surface of the toner particles by the metal titanate particles is preferably at least 2%.

In cases where the coverage ratio is at least 2%, the advantageous effects of retention of charging performance and environmental stability are readily achieved after printing is carried out for a long period of time. In addition, the coverage ratio is more preferably at least 2% and not more than 40% from the perspective of preventing image defects when metal titanate particles become detached from toner particles.

The coverage ratio can be adjusted within the range mentioned above by adjusting, for example, the content of metal titanate particles relative to toner particles, the primary particle diameter of the metal titanate particles, and the mixing conditions when the toner particles are mixed with the metal titanate particles.

From the perspectives of improving charging performance and environmental stability and improving charging performance in high temperature high humidity environments in particular, it is preferable for the metal titanate particles to be surface treated by means of a hydrophobic agent such as a fatty acid, a metal salt thereof, a silicone oil, a silane coupling agent or a titanium coupling agent.

In addition, the metal titanate particles preferably have a hydrophobicity, which is represented by an intermediate methanol concentration (vol. %) between the point at which the transmittance of light having a wavelength of 780 nm starts to decrease and the point at which the transmittance of light having a wavelength of 780 nm stops decreasing in a wettability test by a mixed methanol/water solvent, of at least 20 vol. % and not more than 80 vol. %, and more preferably at least 25 vol. % and not more than 80 vol. %.

In cases where the hydrophobicity falls within the range mentioned above, charging performance, and especially charging performance in high temperature high humidity environments, can be improved after carrying out printing for a long period of time.

The hydrophobicity can be adjusted within the range mentioned above by adjusting the conditions under which surface treatment is carried out using the hydrophobic agent.

The content of metal titanate particles is preferably at least 0.1 parts by mass and not more than 10.0 parts by mass, and more preferably at least 0.2 parts by mass and not more than 3.0 parts by mass, relative to 100 parts by mass of the toner particles.

In cases where this content is at least 0.1 parts by mass, the surface of the toner particles is covered by the metal titanate particles, and it is easy to ensure an area able to contribute to environmental stability of charge.

The device used for mixing the toner particles and the metal titanate particles is not particularly limited, and can be a publicly known mixer such as HENSCHEL MIXER, a MECHANO HYBRID (available from Nippon Coke & Engineering Co., Ltd.), a super mixer or a NOBILTA (available from Hosokawa Micron Corporation).

The metal titanate particles can be produced by means of, for example, a normal pressure thermal reaction method.

Here, a mineral acid-deflocculated product of a hydrolyzate of a titanium compound should be used as a titanium oxide source, and a water-soluble acidic metal compound should be used as a source of a metal other than titanium. In addition, the metal titanate particles can be produced using a method comprising reacting a mixed liquid of the raw materials while adding an aqueous alkaline solution at a temperature of at least 60° C., and then carrying out an acid treatment. In addition, a method comprising carrying out a dry mechanical treatment is known as a method for controlling the shape of metal titanate particles.

An explanation will now be given of the normal pressure thermal reaction method.

A mineral acid-deflocculated product of a hydrolyzate of a titanium compound is used as a titanium oxide source. It is preferable to use a deflocculated material in which the $SO_3$ content, as determined by means of a sulfuric acid method, is preferably not more than 1.0 mass %, and more preferably not more than 0.5 mass %, and in which the pH of meta-titanic acid is adjusted to at least 0.8 and not more than 1.5 by means of hydrochloric acid.

Meanwhile, a nitrate or chloride of a metal, or the like, can be used as a source of a metal other than titanium.

For example, strontium nitrate, magnesium nitrate, calcium nitrate, potassium nitrate, and the like, can be used as nitrates. For example, strontium chloride, magnesium chloride, calcium chloride, potassium chloride, and the like, can be used as chlorides.

Of these, cases where metal titanate particles are produced using a nitrate or chloride of strontium, calcium or magnesium are preferred because the obtained metal titanate particles have a perovskite crystal structure, and can therefore further improve environmental stability of charge.

Caustic alkalis can be used as the aqueous alkaline solution, but of these, an aqueous solution of sodium hydroxide is preferred.

In this production method, factors that influence the particle diameters of the obtained metal titanate particles include the pH when deflocculating meta-titanic acid with hydrochloric acid, the mixing proportions of the titanium oxide source and sources of metals other than titanium, the concentration of the titanium oxide source in the initial stage of the reaction, the temperature and addition speed when the aqueous alkaline solution is added, the reaction time, stirring conditions, and the like. In particular, following addition of the aqueous alkaline solution, terminating the reaction by rapidly lowering the temperature of the system through introduction into ice water or the like can forcibly terminate the reaction while crystal growth is saturated and makes it easier to obtain a broad particle size distribution. In addition, it is possible to achieve a broader particle size distribution by making the reaction system heterogeneous by lowering the stirring speed, altering the stirring method, or the like.

These factors can be adjusted as appropriate in order to obtain metal titanate particles having the desired particle sizes and particle size distribution. Moreover, it is preferable to prevent contamination by carbon dioxide gas by, for example, reacting in a nitrogen gas atmosphere in order to prevent generation of carbonates during the reaction process.

The mixing proportions of the titanium oxide source and sources of metals other than titanium in the reaction are such that if a metal other than titanium is denoted by M and an oxide thereof is denoted by $M_xO$, the $M_xO/TiO_2$ molar ratio is preferably at least 0.90 and not more than 1.40, and more preferably at least 1.05 and not more than 1.20. However, X is 1 in cases where M is an alkaline earth metal and 2 in cases where M is an alkali metal.

In cases where the $M_xO/TiO_2$ molar ratio is less than 0.90, the reaction product includes not only a metal titanate, and may also include unreacted titanium oxide. Because the source of a metal other than titanium exhibits relatively high solubility in water, whereas the titanium oxide source exhibits relatively low solubility in water, in cases where the $M_xO/TiO_2$ molar ratio is less than 0.90, the reaction product includes not only a metal titanate, and may also include unreacted titanium oxide.

The concentration of the titanium oxide source in the initial stage of the reaction is preferably at least 0.050 mol/L and not more than 1.300 mol/L, and more preferably at least 0.080 mol/L and not more than 1.200 mol/L, in terms of $TiO_2$.

By increasing the concentration of the titanium oxide source in the initial stage of the reaction, it is possible to lower the number average particle diameter of primary particles of the metal titanate particles.

It is essential to use a pressure vessel, such as an autoclave, when the temperature at which the aqueous alkaline solution is added is at least 100° C., and a temperature within the range of at least 60° C. and not more than 100° C. is suitable for practical purposes.

In addition, the addition speed of the aqueous alkaline solution is such that a slower addition speed leads to metal titanate particles having large particle diameters and a faster addition speed leads to metal titanate particles having small particle diameters. The addition speed of the aqueous alkaline solution is preferably at least 0.001 eq/h and not more than 1.2 eq/h, and more preferably at least 0.002 eq/h and not more than 1.1 eq/h, relative to the charged raw materials. These can be adjusted as appropriate according to the particle diameter to be achieved.

In this production method, it is preferable to further subject the metal titanate particles, which are obtained using a normal temperature thermal reaction, to an acid treatment. When producing the metal titanate particles by carrying out a normal temperature thermal reaction, in cases where the mixing proportions of the titanium oxide source and a source of a metal other than titanium ($M_xO/TiO_2$ molar ratio) exceeds 1.40, unreacted sources of metals other than titanium remaining following completion of the reaction react with carbon dioxide gas in the air and readily generate impurities such as metal carbonates. In addition, if impurities such as metal carbonates remain on the surface, when a surface treatment is carried out in order to impart hydrophobic properties, it is difficult for the surface treatment agent to cover the particles uniformly because of the impurities. Therefore, after the aqueous alkaline solution is added, an acid treatment should be carried out in order to remove unreacted metal sources.

In the acid treatment, the pH is preferably adjusted to at least 2.5 and not more than 7.0, and more preferably to at least 4.5 and not more than 6.0, by means of hydrochloric acid.

Instead of hydrochloric acid, it is possible to use nitric acid or acetic acid as an acid in the acid treatment. If sulfuric acid is used, metal sulfates, which exhibit low solubility in water, are readily generated.

The toner particles may, if necessary, contain a binder resin, a colorant, a wax, a charge control agent, or the like.

The following polymers and resins can be used as binder resins.

Examples of such polymers and resins include homopolymers of styrene and substituted styrene compounds, such as polystyrene, poly-p-chlorostyrene and poly(vinyl toluene); styrene-based copolymers such as styrene-p-chlorostyrene copolymers, styrene-vinyl toluene copolymers, styrene-vinyl naphthalene copolymers, styrene-acrylic acid ester copolymers, styrene-methacrylic acid ester copolymers, styrene-α-chloromethyl methacrylate copolymers, styrene-acrylonitrile copolymers, styrene-vinyl methyl ether copolymers, styrene-vinyl ethyl ether copolymers, styrene-vinyl methyl ketone copolymers and styrene-acrylonitrile-indene copolymers; poly(vinyl chloride) resins, phenolic resins, natural resin-modified phenolic resins, natural resin-modified maleic acid resins, acrylic resins, methacrylic resins, poly(vinyl acetate) resins, silicone resins, polyester resins, polyurethane resins, polyamide resins, furan resins, epoxy resins, xylene resins, poly(vinyl butyral) resins, terpene resins, cumarone-indene resins and petroleum-based resins.

Of these, it is preferable to use a polyester resin or a styrene-based copolymer from the perspective of achieving both low-temperature fixability and charging performance.

From the perspective of image density stability after printing for long periods of time, the content of a polyester resin is preferably at least 50 mass % and not more than 100 mass %, and more preferably at least 70 mass % and not more than 100 mass %, relative to the overall binder resin.

A polyester resin is a resin having a "polyester structure" in the resin chain.

Examples of components that constitute the polyester structure include dihydric or higher alcohol monomers and at least one type of acid monomer selected from the group consisting of dihydric or higher carboxylic acids, dihydric or higher carboxylic acid anhydrides and dihydric or higher carboxylic acid esters.

Examples of dihydric or higher alcohol monomers include those listed below.

Alkylene oxide adducts of bisphenol A, such as polyoxypropylene(2.2)-2,2-bis(4-hydroxyphenyl)propane, polyoxyethylene(2.2)-2,2-bis(4-hydroxyphenyl)propane, polyoxypropylene(3.3)-2,2-bis(4-hydroxyphenyl)propane, polyoxyethylene(2.0)-2,2-bis(4-hydroxyphenyl)propane, polyoxypropylene(2.0)-polyoxyethylene(2.0)-2,2-bis(4-hydroxyphenyl)propane, and polyoxypropylene(6)-2,2-bis(4-hydroxyphenyl)propane, ethylene glycol, diethylene glycol, triethylene glycol, 1,2-propane diol, 1,3-propane diol, 1,4-butane diol, neopentyl glycol, 1,4-butene diol, 1,5-pentane diol, 1,6-hexane diol, 1,4-cyclohexane dimethanol, dipropylene glycol, polyethylene glycol, polypropylene glycol, polytetramethylene glycol, sorbitol, 1,2,3,6-hexane tetraol, 1,4-sorbitan, pentaerythritol, dipentaerythritol, tripentaerythritol, 1,2,4-butane triol, 1,2,5-pentane triol, glycerin, 2-methylpropane triol, 2-methyl-1,2,4-butane triol, trimethylolethane, trimethylolpropane, and 1,3,5-trihydroxymethylbenzene.

Of these, aromatic diols are preferred, and the content of aromatic diols is more preferably at least 80 mol. % and not more than 100 mol. % relative to all the alcohol monomers that constitute the polyester resin.

Meanwhile, the compounds listed below can be used as acid monomers of dihydric or higher carboxylic acids, dihydric or higher carboxylic acid anhydrides and dihydric or higher carboxylic acid esters.

Aromatic dicarboxylic acids and anhydrides thereof, such as phthalic acid, isophthalic acid and terephthalic acid; alkyl dicarboxylic acids and anhydrides thereof, such as succinic acid, adipic acid, sebacic acid and azelaic acid; succinic acid and anhydrides thereof that are substituted with alkyl groups or alkenyl groups having 6 to 18 carbon atoms; unsaturated dicarboxylic acids and anhydrides thereof, such as fumaric acid, maleic acid and citraconic acid; and esters of these acids.

Of these, terephthalic acid, succinic acid, adipic acid, fumaric acid, trimellitic acid, pyromellitic acid, benzophenonetetracarboxylic acid, and anhydrides and esters of these are preferred.

From the perspective of charging performance, the acid value of the polyester resin is preferably at least 0 mg KOH/g and not more than 50 mg KOH/g, and more preferably at least 1 mg KOH/g and not more than 20 mg KOH/g.

The acid value can be set within the range mentioned above by adjusting the types and blending amounts of monomers used in the resin. Specifically, the blending proportions and molecular weights of alcohol monomers and acid monomers should be adjusted when preparing the resin.

In addition, it is possible to subject an alcohol monomer and an acid monomer to condensation polymerization, and then react a terminal alcohol with a polyvalent acid monomer (for example, trimellitic acid).

The binder resin may be a single resin, but may also be a combination of a plurality of different resins.

In particular, by combining two or more resins having different softening points, it is relatively easy to adjust the storage elastic modulus G' mentioned above within the range mentioned above.

From the perspective of achieving both low-temperature fixability and hot offset resistance, the softening point of the binder resin is preferably at least 70° C. and not more than 180° C., and more preferably at least 80° C. and not more than 160° C.

The toner particles may contain a wax.

Examples of the wax include the types listed below. Hydrocarbon-based waxes such as low molecular weight polyethylene, low molecular weight polypropylene, alkylene copolymers, microcrystalline waxes, paraffin waxes and Fischer Tropsch waxes; oxides of hydrocarbon-based waxes, such as oxidized polyethylene waxes, and block copolymers thereof; waxes comprising mainly fatty acid esters, such as carnauba wax; and waxes obtained by partially or wholly deoxidizing fatty acid esters, such as deoxidized carnauba wax.

Of these, hydrocarbon waxes such as paraffin waxes and Fischer Tropsch waxes and fatty acid ester-based waxes such as carnauba wax are preferred from the perspective of achieving both low-temperature fixability and hot offset resistance.

The wax content is preferably at least 1.0 part by mass and not more than 20.0 parts by mass relative to 100 parts by mass of the binder resin. If the wax content falls within the range mentioned above, hot offset resistance at high temperatures is easily maintained.

In addition, in a rising temperature endothermic curve measured by means of differential scanning calorimetry (DSC), the peak temperature (melting point) of a maximum endothermic peak that falls within the range of at least 30° C. and not more than 200° C. is preferably at least 50° C. and not more than 140° C., and more preferably at least 60° C. and not more than 105° C.

The toner particles may contain a colorant.

Examples of the colorant include those listed below. The colorant may be a single pigment, but using a colorant obtained by combining a dye and a pigment thereby improving the clarity is more preferred from the perspective of full color image quality.

Examples of black colorants include carbon black; and materials that are colored black through use of yellow colorants, magenta colorants and cyan colorants.

Examples of pigments for magenta toners include those listed below.

C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269 and 282; C. I. Pigment Violet 19; and C. I. Vat Red 1, 2, 10, 13, 15, 23, 29 and 35.

Examples of dyes for magenta toners include those listed below.

Oil-soluble dyes such as C. I. Solvent Red 1, 3, 8, 23, 24, 25, 27, 30, 49, 81, 82, 83, 84, 100, 109 and 121; C. I. Disperse Red 9; C. I. Solvent Violet 8, 13, 14, 21 and 27; and C. I. Disperse Violet 1, and basic dyes such as C. I. Basic Red 1, 2, 9, 12, 13, 14, 15, 17, 18, 22, 23, 24, 27, 29, 32, 34, 35, 36, 37, 38, 39 and 40; and C. I.

Basic Violet 1, 3, 7, 10, 14, 15, 21, 25, 26, 27 and 28.

Examples of pigments for cyan toners include those listed below.

C. I. Pigment Blue 2, 3, 15:2, 15:3, 15:4, 16 and 17; C. I. Vat Blue 6; C. I. Acid Blue 45, and copper phthalocyanine pigments in which 1 to 5 phthalimidomethyl groups in the phthalocyanine skeleton are substituted.

An example of a dye for a cyan toner is C. I. Solvent Blue 70.

Examples of pigments for yellow toners include those listed below.

C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181 and 185; and C. I. Vat Yellow 1, 3 and 20.

An example of a dye for yellow toner is C. I. Solvent Yellow 162.

The content of the colorant is preferably at least 1 part by mass and not more than 20 parts by mass relative to 100 parts by mass of the binder resin.

The toner particles may contain a charge control agent.

Examples of the charge control agent include those listed below.

Examples of negative type charge control agents include metal salicylate compounds, metal naphthoate compounds, metal dicarboxylate compounds, polymer type compounds having a sulfonic acid or carboxylic acid in a side chain, polymer type compounds having a sulfonic acid salt or sulfonic acid ester in a side chain, polymer type compounds having a carboxylic acid salt or carboxylic acid ester in a side chain, boron compounds, urea compounds, silicon compounds and calixarenes.

The charge control agent may be internally or externally added to the toner particles.

The content of the charge control agent is preferably at least 0.2 parts by mass and not more than 10.0 parts by mass relative to 100 parts by mass of the binder resin.

The toner may, if necessary, contain inorganic fine particles other than the metal titanate particles.

Inorganic fine particles may be internally added to the toner particles or mixed as an external additive with the toner particles.

Preferred examples of external additives other than metal titanate particles include inorganic fine particles such as silica fine particles, titanium oxide fine particles and aluminum oxide fine particles.

These inorganic fine particles are preferably hydrophobized by means of a hydrophobic agent such as a silane compound, a silicone oil or a mixture of these.

In cases where improved flowability is required, the specific surface area, as measured using the BET method, is preferably at least 50 m$^2$/g and not more than 400 m$^2$/g, and in cases where stability of durability is required, the specific surface area, as measured using the BET method, is preferably at least 10 m$^2$/g and not more than 50 m$^2$/g.

In order to achieve both improved flowability and stable durability, it is possible to use a combination of types of inorganic fine particle whose specific surface areas fall within the ranges mentioned above.

The content of an external additive other than the metal titanate particles is preferably at least 0.1 parts by mass and not more than 10.0 parts by mass relative to 100 parts by mass of the toner particles.

When mixing the toner particles with the external additive, a publicly known mixer such as a HENSCHEL MIXER should be used.

The toner can also be used as a single component developer, but from the perspective of further improving dot reproducibility and forming stable images over a long period of time, the toner can be used as a two component developer that is mixed with a magnetic carrier.

The magnetic carrier can be an ordinary publicly known carrier, such as particles of a metal such as iron, lithium, calcium, magnesium, nickel, copper, zinc, cobalt, manganese or a rare earth element, or particles of alloys or oxides of these metals; a magnetic body such as ferrite; or a magnetic body-dispersed resin carrier (a so-called resin carrier) that contains a magnetic body and a binder resin that holds the magnetic body in a dispersed state.

In cases where the toner is used as a two component developer that is mixed with a magnetic carrier, the content of the toner in the two component developer is preferably at least 2 mass % and not more than 15 mass %, and more preferably at least 4 mass % and not more than 13 mass %.

The method for producing the toner particles can be a conventional publicly known method, such as a pulverization method, an emulsion aggregation method, a melt kneading method or a dissolution suspension method, and is not particularly limited.

An example will now be given of a production method for producing toner particles by means of a pulverization method.

In a raw material mixing step, prescribed amounts of a binder resin, a colorant, a wax, and the like, which serve as materials that constitute the toner particles, are weighed out, blended and mixed.

Next, the mixed materials are melt kneaded so as to disperse the colorant, the wax, and the like, in the binder resin. In a melt kneading step, a batch type kneader, such as a pressurizing kneader or Banbury mixer, or a continuous type kneader can be used. Single screw and twin screw extruders are commonly used due to advantages in terms of continuous production. Examples thereof include KTK type twin screw extruders (available from Kobe Steel, Ltd.), TEM type twin screw extruders (available from Toshiba Machine Co., Ltd.), PCM kneaders (available from Ikegai Corporation), twin screw extruders (available from KCK), co-kneaders (available from Buss AG) and Kneadex (available from Nippon Coke & Engineering Co., Ltd.). Furthermore, a resin composition obtained by melt kneading is rolled using a 2-roll roller or the like, and may be cooled by means of water or the like in a cooling step.

Next, the obtained cooled product is pulverized to the required particle diameter in a pulverizing step.

In the pulverizing step, coarse pulverization is carried out using a pulverizer such as a crusher, hammer mill or feather mill. Next, fine pulverization should be carried out by means of a Kryptron System (available from Kawasaki Heavy Industries, Ltd.), a Super Rotor (available from Nisshin Engineering Inc.), a Turbo Mill (available from Freund Turbo Corporation) or an air jet type fine pulverizer.

Next, toner particles are obtained by classification by means of a classifier or sieving machine such as an inertial classification type Elbow-Jet (available from Nittetsu Mining Co., Ltd.), a centrifugal classification type Turboplex (available from Hosokawa Micron Corporation), a TSP separator (available from Hosokawa Micron Corporation) or a Faculty (available from Hosokawa Micron Corporation) if necessary.

Toner particles produced using the method described above may be mixed with metal titanate particles and external additives that are selected according to need.

Explanations will now be given of methods for measuring a variety of physical properties of the toner and other materials.

Physical properties of the metal titanate particles may be measured using the toner as a sample. In addition, in cases where physical properties of the metal titanate particles and toner particles are measured from a toner to which the metal titanate particles have been externally added, it is possible to carry out measurements after separating the metal titanate particles and other external additives from the toner.

For example, a toner is dispersed in methanol by means of ultrasonic waves so as to remove the metal titanate particles and other external additives, and then allowed to stand for 24 hours. The sedimented toner particles and the metal titanate particles and other external additives dispersed in the supernatant liquid are separated, recovered and thoroughly dried so as to isolate the toner particles. In addition, by subjecting the supernatant liquid to centrifugal separation, it is possible to isolate the metal titanate particles.

<Methods for Calculating Particle Diameter, Particle Size Distribution, Average Circularity, Circularity Distribution and Coverage Ratio of Metal Titanate Particles on Surface of Toner Particles>

Physical properties of the metal titanate particles are calculated by analyzing images of surface of toner particles, which are taken with a Hitachi Ultra-high Resolution Field Emission-Scanning Electron Microscope (SEM; S-4800, available from Hitachi High-Technologies Corporation), using image analysis software (Image-Pro Plus ver. 5.0, produced by Nippon Roper K.K.).

Metal titanate particles present on the surface of toner particles are observed using the SEM apparatus mentioned above.

When carrying out observations, a location where the surface of a toner particle is as flat as possible is selected.

Metal titanate particles and other external additives are differentiated from each other by analyzing toner particle surfaces in the field of view using Energy Dispersive X-ray Spectroscopy (EDX), and images obtained by extracting only metal titanate particles on the surface of toner particles are binarized and subjected to the following analysis.

In the cumulative frequency of circle-equivalent diameters from obtained images, D10 denotes the particle diameter at which the cumulative value from the small particle diameter side reaches 10% by number, D50 denotes the particle diameter at which the cumulative value from the small particle diameter side reaches 50% by number, and D90 denotes the particle diameter at which the cumulative value from the small particle diameter side reaches 90% by number. 10 toner particles are subjected to the same procedure, and the average value thereof is determined.

The D50 value, the particle size distribution index A (D90/D10) and the particle size distribution index B (D90/D50) are calculated from the determined values.

In addition, the average circularity, the proportion of particles having a circularity of at least 0.90 and the proportion of particles having a circularity of not more than 0.60 are determined from images obtained by extracting only metal titanate particles.

10 toner particles are subjected to the same procedure, and the average value thereof is determined.

In addition, the coverage ratio is calculated as the ratio of the area occupied by the metal titanate particles relative to the area of the surface of the toner particles in the binarized image mentioned above.

Moreover, the physical properties of the metal titanate particles in these measurements are calculated on the basis of secondary particles including aggregates, not on the basis of primary particles.

<Method for Measuring Hydrophobicity of Metal Titanate Particles>

The hydrophobicity of the metal titanate particles is measured using the method described below.

First, 70 mL of a water-containing methanol liquid whose methanol concentration (vol. %) is already known is placed in a cylindrical glass container having a diameter of 5 cm and a thickness of 1.75 mm, and then dispersed for 5 minutes using an ultrasonic disperser in order to remove bubbles and the like in the measurement sample.

Next, a measurement sample liquid is prepared by weighing out 0.1 g of metal titanate particles and adding these to the container into which the water-containing methanol liquid was introduced.

The measurement sample liquid is then placed in a "WET-100P" powder wettability tester (available from Rhesca Co., Ltd.). This measurement sample liquid is stirred at a speed of 6.7 $s^{-1}$ (400 rpm) using a magnetic stirrer. Moreover, a fluororesin-coated spindle-like rotor having a length of 25 mm and a maximum body diameter of 8 mm is used as the rotor of the magnetic stirrer.

Next, this measurement sample liquid is placed in the apparatus mentioned above, the transmittance of light having a wavelength of 780 nm is measured while continuously adding methanol dropwise at a rate of 1.5 mL/min, and a methanol addition-transmittance curve is prepared.

The hydrophobicity of the metal titanate particles is calculated as an intermediate methanol concentration (vol. %) between the point at which the transmittance of light starts to decrease and the point at which the transmittance of light stops decreasing.

<Method for Measuring Weight-Average Particle Diameter (D4) of Toner Particles>

The weight-average particle diameter (D4) of the toner particles is calculated by carrying out measurements using a precision particle size distribution measuring device which employees a pore electrical resistance method and uses a 100-μm aperture tube ("Coulter Counter Multisizer 3" (registered trademark) available from Beckman Coulter, Inc.) and accompanying dedicated software that is used to set measurement conditions and analyze measured data ("Beckman Coulter Multisizer 3 Version 3.51" produced by Beckman Coulter, Inc.) (No. of effective measurement channels: 25,000), and then analyzing the measurement data.

A solution obtained by dissolving special grade sodium chloride in deionized water at a concentration of approximately 1 mass %, such as "ISOTON II" (produced by Beckman Coulter, Inc.), can be used as an aqueous electrolyte solution used in the measurements.

Moreover, the dedicated software was set up as follows before carrying out measurements and analysis.

On the "Standard operating method (SOM) alteration screen" in the dedicated software, the total count number in control mode is set to 50,000 particles, the number of measurements is set to 1, and the Kd value is set to value obtained using "standard particle 10.0 μm" (Beckman Coulter, Inc.). By pressing the threshold value/noise level measurement button, threshold values and noise levels are automatically set. In addition, the current is set to 1600 μA, the gain is set to 2, the aqueous electrolyte solution is set to ISOTON II, and the "Flush aperture tube after measurement" option is checked.

On the "Screen for setting converting from pulse to particle diameter" in the dedicated software, the bin interval is set to logarithmic particle diameter, the particle diameter bin is set to 256 particle diameter bin, and the particle diameter range is set to at least 2 μm and not more than 60 μm.

The specific measurement method is as described in steps (1) to (7) below.

(1) Approximately 200 mL of the aqueous electrolyte solution is placed in 250 mL glass round bottomed beaker dedicated to Multisizer 3, the beaker is set on a sample stand, and a stirring rod is rotated anticlockwise at a rate of 24 rotations/sec. By carrying out the "Aperture flush" function of the dedicated software, dirt and bubbles in the aperture tube are removed.

(2) Approximately 30 mL of the aqueous electrolyte solution is placed in a 100 mL glass flat bottomed beaker, and approximately 0.3 mL of a diluted liquid, which is obtained by diluting "Contaminon N" (a 10 mass % aqueous solution of a neutral detergent for cleaning precision measurement equipment, which has a pH of 7 and comprises a non-ionic surfactant, an anionic surfactant and an organic builder, available from Wako Pure Chemical Industries, Ltd.) 3 mass-fold with deionized water, is added to the beaker as a dispersant.

(3) A prescribed amount of deionized water is placed in a water bath of an "Ultrasonic Dispersion System Tetora 150" (ultrasonic disperser available from Nikkaki Bios Co., Ltd.) having an electrical output of 120 W, in which 2 oscillators having an oscillation frequency of 50 kHz are housed so that their phases are staggered by 180°, and approximately 2 mL of the Contaminon N is added to the water bath.

(4) The beaker mentioned in section (2) above is placed in a beaker-fixing hole of the ultrasonic disperser, and the ultrasonic disperser is activated. The height of the beaker is adjusted so that the resonant state of the liquid surface of the aqueous electrolyte solution in the beaker is at a maximum.

(5) While the aqueous electrolyte solution in the beaker mentioned in section (4) above is being irradiated with ultrasonic waves, approximately 10 mg of toner particles are added a little at a time to the aqueous electrolyte solution and dispersed therein. The ultrasonic dispersion treatment is continued for a further 60 seconds. Moreover, when carrying out the ultrasonic dispersion, the temperature of the water bath is adjusted as appropriate to a temperature of at least 10° C. and not more than 40° C.

(6) The aqueous electrolyte solution mentioned in section (5) above, in which the toner particles are dispersed, is added dropwise by means of a pipette to the round bottomed beaker mentioned in section (1) above, which is disposed on the sample stand, and the measurement concentration is adjusted to approximately 5%. Measurements are carried out until the number of particles measured reaches 50,000.

(7) The weight-average particle diameter (D4) is calculated by analyzing measurement data using the accompanying dedicated software. Moreover, when setting the graph/vol. % with the dedicated software, the "average diameter" on the analysis/volume-based statistical values (arithmetic mean) screen is weight-average particle diameter (D4).

<Methods for Measuring Storage Elastic Modulus G' and Loss Tangent (Tan δ) of Toner>

The storage elastic modulus G' and loss tangent (tan δ) of the toner are measured using an "ARES" rotating plate rheometer (available from TA Instruments).

A sample obtained by pressure molding a toner into the shape of a disk having a diameter of 25 mm and a thickness of 2.0±0.3 mm using a tablet molding machine under a temperature of 25° C. is used as a measurement sample.

The sample is disposed between parallel plates, the temperature is increased from room temperature (25° C.) to 110° C. over a period of 15 minutes, the shape of the sample is adjusted, the sample is then cooled to the viscoelasticity measurement start temperature, and measurements are then started.

Here, the sample is set in such a way that the initial normal force is 0.

In addition, by adjusting the automatic tension (to Auto Tension Adjustment ON), it is possible to cancel out effects of normal forces in subsequent measurements, as explained below.

The measurements are carried out under the following conditions.
(1) Parallel plates having diameters of 25 mm are used.
(2) The frequency is 6.28 rad/sec (1.0 Hz).
(3) The initial applied strain is set to 1.0%.
(4) Within the range 100° C. to 200° C., measurements are carried out at a ramp rate of 2.0° C./min. Moreover, measurements are carried out under the following preset conditions for automatic adjustment mode. Measurements are carried out under Auto Strain mode.
(5) The Max Applied Strain is set to 40.0%.
(6) The Max Allowed Torque is set to 150.0 g·cm, and the Min Allowed Torque is set to 0.2 g·cm.
(7) Strain Adjustment is set to 20.0% of Current Strain. Auto Tension mode is used for the measurements.
(8) Auto Tension Direction is set to Compression.
(9) Initial Static Force is set to 10.0 g, and Auto Tension Sensitivity is set to 40.0 g.
(10) Auto Tension operation conditions are a Sample Modulus of at least $1.0 \times 10^3$ Pa.

<Method for Measuring Softening Point (Tm) of Binder Resin>

The softening point of the binder resin is measured using a constant load extrusion type capillary rheometer "Flow Tester CFT-500D Flow Characteristics Analyzer" (available from Shimadzu Corporation), with the measurements being carried out in accordance with the manual provided with the apparatus.

In this apparatus, the temperature of a measurement sample filled in a cylinder is increased, a constant load is applied from above by means of a piston, thereby melting the sample, the sample is extruded through a die at the bottom of the cylinder, and a flow curve can be obtained from the amount of piston travel and the temperature during this process.

In addition, the softening point was taken to be the "melting temperature by the half method" described in the manual provided with the "Flow Tester CFT-500D Flow Characteristics Analyzer".

The melting temperature by the half method is calculated as follows.

First, half of the difference between the amount of piston travel at the completion of outflow (Smax) and the amount of piston travel at the start of outflow (Smin) is determined (This is designated as X. X=(Smax−Smin)/2). Next, the temperature in the flow curve when the amount of piston travel reaches the sum of X and Smin is taken to be the melting temperature by the half method.

The measurement sample is prepared by subjecting approximately 1.0 g of a resin to compression molding for approximately 60 seconds at approximately 10 MPa in a 25° C. environment using a tablet compression molder (NT-100H available from NPa System Co., Ltd.) to provide a cylindrical shape with a diameter of approximately 8 mm.

The measurement conditions for the CFT-500D are as follows.
Test mode: rising temperature method
Start temperature: 50° C.
End point temperature: 200° C.
Measurement interval: 1.0° C.
Ramp rate: 4.0° C./min
Piston cross section area: 1.000 cm²
Test load (piston load): 10.0 kgf (0.9807 MPa)
Preheating time: 300 seconds
Diameter of die orifice: 1.0 mm
Die length: 1.0 mm <Method for Measuring Peak Temperature (Melting Point) of Maximum Endothermic Peak of Wax>

The peak temperature of the maximum endothermic peak of a wax is measured in accordance with ASTM D3418-82 using a "Q1000" differential scanning calorimeter (available from TA Instruments).

Temperature calibration of the detector in the apparatus is performed using the melting points of indium and zinc, and heat amount calibration is performed using the heat of fusion of indium.

Specifically, approximately 10 mg of wax is precisely weighed out and placed in an aluminum pan, and an empty aluminum pan is used as a reference.

Within the temperature measurement range of at least 30° C. and not more than 200° C., measurements are carried out at a ramp rate of 10° C./min.

Moreover, when carrying out measurements, the temperature is once increased to 200° C., then lowered to 30° C., and then increased again. The peak temperature (melting point) is determined from maximum endothermic peaks on the DSC curve within the temperature range of at least 30° C. and not more than 200° C. in the second temperature increase steps.

<Method for Measuring BET Specific Surface Area of Inorganic Fine Particles>

The BET specific surface area of the inorganic fine particles is measured in accordance with JIS 28830 (2001). The specific measurement method is as follows.

A "TriStar 3000" micromeritics automatic surface area and porosimetry analyzer (available from Shimadzu Corporation), which uses a fixed volume-based gas adsorption method as a measurement method, is used as the measurement apparatus. Setting of measurement conditions and analysis of measured data are carried out using "TriStar 3000 Version 4.00" dedicated software provided with the apparatus. In this apparatus, a vacuum pump, nitrogen gas piping and helium gas piping are connected. The BET specific surface area of the inorganic fine particles is deemed to be a value calculated by means of a BET multipoint method using nitrogen gas as the adsorbed gas.

Moreover, the BET specific surface area is calculated in the manner described below.

First, nitrogen gas is adsorbed by the inorganic fine particles, and the equilibrium pressure P (Pa) in the sample cell and the adsorbed amount of nitrogen on the external additive Va (mol/g) are measured at this point. In addition, an adsorption isotherm is obtained, with relative pressure Pr, which is a value obtained by dividing the equilibrium pressure P (Pa) in the sample cell by the saturated vapor pressure of nitrogen Po (Pa), being the horizontal axis and the adsorbed amount of nitrogen Va (mol/g) being the vertical axis. Next, the unimolecular layer adsorption amount Vm (mol/g), which is the adsorbed amount required to form a unimolecular layer on the surface of the external additive, is determined using the BET equation below.

$$Pr/Va(1-Pr)=1/(Vm \times C)+(C-1) \times Pr/(Vm \times C)$$

Here, C denotes the BET parameter, and is a variable that varies according to the type of measurement sample, the type of gas being adsorbed and the adsorption temperature.

If the X axis is Pr and the Y axis is Pr/Va (1−Pr), it can be understood that the BET equation is a straight line in which the slope is (C−1)/(Vm×C) and the intercept is 1/(Vm×C). This straight line is known as a BET plot.

Slope of straight line=$(C-1)/(Vm \times C)$

Intercept of straight line=$1/(Vm \times C)$

By plotting measured values for Pr and measured values for Pr/Va (1−Pr) on a graph and drawing a straight line using the least squares method, it is possible to calculate the slope of the straight line and the intercept value. By inputting these values into the numerical formula above and solving the obtained simultaneous equations, it is possible to calculate Vm and C.

Furthermore, the BET specific surface area S (m²/g) of the inorganic fine particles is calculated from the calculated Vm value and the molecular cross-sectional area nitrogen molecules (0.162 nm²) using the formula below.

$$S = Vm \times N \times 0.162 \times 10^{-18}$$

Here, N denotes Avogadro's number (mol⁻¹).

Measurements obtained using this apparatus are in accordance with the "TriStar 3000 user manual V4.0" provided with the apparatus, but measurements are carried out specifically using the procedure below.

The tare mass of a thoroughly washed and dried dedicated glass sample cell (stem diameter ⅜ inch, volume approximately 5 mL) is precisely measured. Next, approximately 0.1 g of an external additive is placed in the sample cell using a funnel.

The sample cell containing the inorganic fine particles is placed in a "VacuPrep 061" pretreatment device (available from Shimadzu Corporation) connected to a vacuum pump and nitrogen gas piping, and vacuum air removal is continued for approximately 10 hours at a temperature of 23° C. Moreover, when carrying out the vacuum air removal, air is gradually removed while adjusting a valve so that the inorganic fine particles are not drawn into the vacuum pump. The pressure inside the sample cell gradually decreases as air is removed, and ultimately reaches a pressure of approximately 0.4 Pa (approximately 3 millitorr). Following completion of the vacuum air removal, nitrogen gas is slowly injected into the sample cell, the sample cell is allowed to return to atmospheric pressure, and the sample cell is removed from the pretreatment device. In addition, the mass of the sample cell is precisely weighed, and the exact mass of the external additive is calculated from the difference between the mass of the sample cell and the tare mass mentioned above. Here, the sample cell is sealed with a rubber stopper while being weighed so that the external additive in the sample cell is not contaminated by moisture in the air, or the like.

Next, a dedicated "isothermal jacket" is attached to the stem part of the sample cell containing the inorganic fine particles. Dedicated filler rods are then introduced into the sample cell, and the sample cell is placed in an analysis port of the apparatus. Moreover, the isothermal jacket is a cylindrical member which has an inner surface constituted from a porous material and an outer surface constituted from an impervious material and which can draw liquid nitrogen up to a certain level by means of capillary action.

Next, the sample cell, including connected equipment, is subjected to free space measurements. Free space is calculated by measuring the volume of the sample cell using helium gas at a temperature of 23° C., then using helium gas to measure the volume of the sample cell after the sample cell is cooled by means of liquid nitrogen, and then calculating the difference between these volumes. In addition, the saturated vapor pressure of nitrogen Po (Pa) is automatically measured separately using a Po tube housed in the apparatus.

Next, the sample cell subjected to vacuum air removal, and then cooled by means of liquid nitrogen while continuing the vacuum air removal. Next, nitrogen gas is introduced incrementally into the sample cell and nitrogen molecules are adsorbed on the inorganic fine particles. Here, because the adsorption isotherm mentioned above is obtained by measuring the equilibrium pressure P (Pa) at appropriate times, this adsorption isotherm is converted into a BET plot. Moreover, the relative pressure Pr points at which data is collected are a total of 6 points, namely 0.05, 0.10, 0.15, 0.20, 0.25 and 0.30. A straight line is drawn from the obtained measurement data using the least squares method, and the value of Vm is calculated from the slope and intercept of this straight line. Furthermore, the BET specific surface area of the inorganic fine particles is calculated from this Vm value in the manner described above.

<Method for Measuring Acid Value of Resin>

Acid value is the number of milligrams of potassium hydroxide required to neutralize acid contained in 1 g of sample. The acid value of the resin is measured in accordance with JIS K 0070-1992, but is specifically measured using the following procedure.

(1) Reagent Preparation

A phenolphthalein solution is obtained by dissolving 1.0 g of phenolphthalein in 90 mL of ethyl alcohol (95 vol. %) and adding ion exchanged water up to a volume of 100 mL.

7 g of special grade potassium hydroxide is dissolved in 5 mL of water, and ethyl alcohol (95 vol. %) is added up to a volume of 1 L. A potassium hydroxide solution is obtained by placing the obtained solution in an alkali-resistant container so as not to be in contact with carbon dioxide gas or the like, allowing solution to stand for 3 days, and then filtering. The obtained potassium hydroxide solution is stored in the alkali-resistant container. The factor of the potassium hydroxide solution is determined by placing 25 mL of 0.1 mol/L hydrochloric acid in a conical flask, adding several drops of the phenolphthalein solution, titrating with the potassium hydroxide solution, and determining the factor from the amount of the potassium hydroxide solution required for neutralization. The 0.1 mol/L hydrochloric acid was prepared in accordance with JIS K 8001-1998.

(2) Operation (A) Main test 2.0 g of a sample is measured precisely into a 200-mL conical flask, 100 mL of a mixed toluene/ethanol (2:1) solution is added, and the sample is dissolved over a period of 5 hours. Next, several drops of the phenolphthalein solution are added as an indicator, and titration is carried out using the potassium hydroxide solution. Moreover, the endpoint of the titration is deemed to be the point when the pale crimson color of the indicator is maintained for approximately 30 seconds.

(B) Blank Test

Titration is carried out in the same way as in the operation described above, except that the sample is not used (that is, only a mixed toluene/ethanol (2:1) solution is used).

(3) The Acid Value is Calculated by Inputting the Obtained Results into the Formula Below.

$$A = [(C-B) \times f \times 5.61]/S$$

Here, A denotes the acid value (mg KOH/g), B denotes the added amount (mL) of the potassium hydroxide solution in the blank test, C denotes the added amount (mL) of the potassium hydroxide solution in the main test, f denotes the factor of the potassium hydroxide solution, and S denotes the mass (g) of the sample.

EXAMPLES

The present invention will now be explained by means of production examples and examples, but is in no way limited to these examples. Moreover, numbers of parts in the examples and comparative examples are all based on masses, unless explicitly stated otherwise.

<Production Example of Metal Titanate Particles 1>

Meta-titanic acid produced using the sulfuric acid method was subjected to iron removal and bleaching, after which a 3 mol/L aqueous solution of sodium hydroxide was added, the pH was adjusted to 9.0, desulfurization treatment was carried out, and the meta-titanic acid was then neutralized to a pH of 5.6 by means of 5 mol/L hydrochloric acid, filtered and then washed with water. Water was added to the washed cake so as to obtain a slurry containing 1.90 mol/L of $TiO_2$, after which deflocculation treatment was carried out by adjusting the pH to 1.4 by means of hydrochloric acid.

1.90 mol (in terms of $TiO_2$) of desulfurized and deflocculated meta-titanic acid was obtained and placed in a 3 L reaction vessel. 2.185 mol of an aqueous solution of strontium chloride was added to the deflocculated meta-titanic acid slurry so that the $SrO/TiO_2$ molar ratio was 1.15, and the $TiO_2$ concentration was then adjusted to 1.039 mol/L.

Next, the temperature was increased to 90° C. while stirring and mixing, 440 mL of a 10 mol/L aqueous solution of sodium hydroxide was added over a period of 40 minutes, stirring was then continued at 95° C. for a further 45 minutes, and the reaction was then terminated through rapid cooling by introducing into ice water.

This reaction slurry was heated to 70° C., 12 mol/L hydrochloric acid was added until the pH reached 5.0, stirring was continued for 1 hour, and the obtained precipitate was decanted.

The slurry containing the obtained precipitate was adjusted to a temperature of 40° C., hydrochloric acid was added so as to adjust the pH to 2.5, and n-octyltriethoxysilane was then added in an amount of 4.0 mass % relative to the solid content and stirred for 10 hours. A 5 mol/L aqueous solution of sodium hydroxide was added so as to adjust the pH to 6.5, stirring was continued for 1 hour, the slurry was then filtered and washed, and the obtained cake was dried for 8 hours in air at a temperature of 120° C. so as to obtain metal titanate particles 1. The hydrophobicity of the obtained metal titanate particles 1 was 40%. The physical properties are shown in Table 1.

<Production Examples of Metal Titanate Particles 2 to 10, 17 and 18>

Metal titanate particles 2 to 10, 17 and 18 were obtained in a similar way, except that, in the production example of metal titanate particles 1, the $TiO_2$ concentration in the mixed solution following addition of the aqueous solution of strontium chloride, the period of time over which the aqueous solution of sodium hydroxide was added dropwise, the period of time over which stirring was carried out following the dropwise addition and whether or not rapid cooling was carried out were changed in the manner shown in Table 1. The physical properties are shown in Table 1.

<Production Example of Metal Titanate Particles 11>

Metal titanate particles 11 were obtained in a similar way, except that the concentration of the solid content of n-octyltriethoxysilane in the production example of metal titanate particles 1 was changed to 8.0 mass %. The physical properties are shown in Table 1.

<Production Example of Metal Titanate Particles 12>

Metal titanate particles 12 were obtained in a similar way, except that the n-octyltriethoxysilane used in the production example of metal titanate particles 1 was replaced with isobutyltrimethoxysilane. The physical properties are shown in Table 1.

<Production Example of Metal Titanate Particles 13>

Metal titanate particles 13 were obtained in a similar way, except that the strontium chloride used in the production example of metal titanate particles 1 was replaced with calcium chloride. The physical properties are shown in Table 1.

<Production Example of Metal Titanate Particles 14>

Metal titanate particles 14 were obtained in a similar way, except that the strontium chloride used in the production example of metal titanate particles 1 was replaced with magnesium chloride. The physical properties are shown in Table 1.

<Production Example of Metal Titanate Particles 15>

Metal titanate particles 15 were obtained in a similar way, except that the strontium chloride used in the production example of metal titanate particles 1 was replaced with potassium chloride. The physical properties are shown in Table 1.

<Production Example of Metal Titanate Particles 16>

Meta-titanic acid produced using the sulfuric acid method was subjected to iron removal and bleaching, after which a 3 mol/L aqueous solution of sodium hydroxide was added, the pH was adjusted to 9.0, desulfurization treatment was carried out, and the meta-titanic acid was then neutralized to a pH of 5.6 by means of 5 mol/L hydrochloric acid, filtered and then washed with water. Water was added to the washed cake so as to obtain a slurry containing 1.90 mol/L of $TiO_2$, after which deflocculation treatment was carried out by adjusting the pH to 2.0 by means of hydrochloric acid.

1.90 mol (in terms of $TiO_2$) of desulfurized and deflocculated meta-titanic acid was obtained and placed in a 3 L reaction vessel. 2.185 mol of an aqueous solution of strontium chloride was added to the deflocculated meta-titanic acid slurry so that the $SrO/TiO_2$ molar ratio was 1.17, and the $TiO_2$ concentration was then adjusted to 1.257 mol/L.

Next, the temperature was increased to 90° C. while stirring and mixing, 440 mL of a 10 mol/L aqueous solution of sodium hydroxide was added over a period of 60 minutes, stirring was then continued at 95° C. for a further 45 minutes, and the reaction was then terminated through rapid cooling by introducing into ice water.

This reaction slurry was heated to 70° C., 12 mol/L hydrochloric acid was added until the pH reached 5.0, stirring was continued for 1 hour, and the obtained precipitate was decanted.

The slurry containing the obtained precipitate was adjusted to a temperature of 40° C., hydrochloric acid was added so as to adjust the pH to 2.5, and n-octyltriethoxysilane was then added in an amount of 4.0 mass % relative to the solid content and stirred for 10 hours. A 5 mol/L aqueous solution of sodium hydroxide was added so as to adjust the pH to 6.5, stirring was continued for 1 hour, the slurry was then filtered and washed, and the obtained cake was dried for 8 hours in air at a temperature of 120° C. so as to obtain metal titanate particles 16. The physical properties are shown in Table 1.

<Production Example of Metal Titanate Particles 19>

Meta-titanic acid produced using the sulfuric acid method was subjected to iron removal and bleaching, after which a 3 mol/L aqueous solution of sodium hydroxide was added, the pH was adjusted to 9.0, desulfurization treatment was carried out, and the meta-titanic acid was then neutralized to a pH of 5.6 by means of 5 mol/L hydrochloric acid, filtered and then washed with water. Water was added to the washed cake so as to obtain a slurry containing 1.90 mol/L of $TiO_2$, after which deflocculation treatment was carried out by adjusting the pH to 1.4 by means of hydrochloric acid.

1.90 mol (in terms of $TiO_2$) of desulfurized and deflocculated meta-titanic acid was obtained and placed in a 3 L reaction vessel. 2.185 mol of an aqueous solution of strontium chloride was added to the deflocculated meta-titanic acid slurry so that the $SrO/TiO_2$ molar ratio was 1.15, and the $TiO_2$ concentration was then adjusted to 1.443 mol/L.

Next, the temperature was increased to 90° C. while stirring and mixing, 440 mL of a 10 mol/L aqueous solution of sodium hydroxide was added over a period of 50 minutes, stirring was then continued at 95° C. for a further 30 minutes, and the reaction was then terminated through rapid cooling by introducing into ice water.

This reaction slurry was cooled to 70° C., 12 mol/L hydrochloric acid was added until the pH reached 5.0, stirring was continued for 1 hour, and the obtained precipitate was decanted.

The slurry containing the obtained precipitate was adjusted to a temperature of 40° C., hydrochloric acid was added so as to adjust the pH to 2.5, and n-octyltriethoxysilane was then added in an amount of 4.0 mass % relative to the solid content and stirred for 10 hours. A 5 mol/L aqueous solution of sodium hydroxide was added so as to adjust the pH to 6.5, stirring was continued for 1 hour, the slurry was then filtered and washed, and the obtained cake was dried for 8 hours in air at a temperature of 120° C. so as to obtain metal titanate particles 19. The physical properties are shown in Table 1.

TABLE 1

| Metal titanate particle No. | pH when deflocculating meta-titanic acid slurry | Charging | | | Reaction | | | |
|---|---|---|---|---|---|---|---|---|
| | | $TiO_2$ concentration (mol/L) | Source of non-Ti metal | $M_xO/TiO_2$ molar ratio | Heating temperature (° C.) | Aqueous NaOH solution concentration (mol/L) | Dropwise addition time (minutes) | Stirring temperature after dropwise addition (° C.) |
| 1 | 1.4 | 1.039 | $SrCl_2$ | 1.15 | 90 | 10 | 40 | 95 |
| 2 | 1.4 | 1.039 | $SrCl_2$ | 1.15 | 90 | 10 | 50 | 95 |
| 3 | 1.4 | 1.039 | $SrCl_2$ | 1.15 | 90 | 10 | 60 | 95 |
| 4 | 1.4 | 1.039 | $SrCl_2$ | 1.15 | 90 | 10 | 45 | 95 |
| 5 | 1.4 | 1.039 | $SrCl_2$ | 1.15 | 90 | 10 | 35 | 95 |
| 6 | 1.4 | 1.088 | $SrCl_2$ | 1.15 | 90 | 10 | 45 | 95 |
| 7 | 1.4 | 1.112 | $SrCl_2$ | 1.15 | 90 | 10 | 45 | 95 |
| 8 | 1.4 | 0.969 | $SrCl_2$ | 1.15 | 90 | 10 | 45 | 95 |
| 9 | 1.4 | 0.969 | $SrCl_2$ | 1.15 | 90 | 10 | 80 | 95 |
| 10 | 1.4 | 0.969 | $SrCl_2$ | 1.15 | 90 | 10 | 35 | 95 |
| 11 | 1.4 | 1.039 | $SrCl_2$ | 1.15 | 90 | 10 | 40 | 95 |
| 12 | 1.4 | 1.039 | $SrCl_2$ | 1.15 | 90 | 10 | 40 | 95 |
| 13 | 1.4 | 1.039 | $CaCl_2$ | 1.15 | 90 | 10 | 40 | 95 |
| 14 | 1.4 | 1.039 | $MgCl_2$ | 1.15 | 90 | 10 | 40 | 95 |
| 15 | 1.4 | 1.039 | KCl | 1.15 | 90 | 10 | 40 | 95 |
| 16 | 2.0 | 1.257 | $SrCl_2$ | 1.17 | 90 | 10 | 60 | 95 |
| 17 | 1.4 | 0.921 | $SrCl_2$ | 1.15 | 90 | 10 | 45 | 95 |
| 18 | 1.4 | 0.921 | $SrCl_2$ | 1.15 | 90 | 10 | 45 | 95 |
| 19 | 1.4 | 1.443 | $SrCl_2$ | 1.15 | 90 | 12 | 50 | 95 |

| Metal titanate particle No. | Reaction | | Acid treatment | | Surface treatment | | Particle properties | |
|---|---|---|---|---|---|---|---|---|
| | Stirring time (minutes) | Rapid cooling | pH | Treatment time (hours) | Treatment agent | Treatment amount (mass %) | Number average primary particle diameter (nm) | Hydro phobicity (%) |
| 1 | 45 | Yes | 5.0 | 1 | A | 4.0 | 40 | 40 |
| 2 | 45 | Yes | 5.0 | 1 | A | 4.0 | 55 | 42 |
| 3 | 45 | Yes | 5.0 | 1 | A | 4.0 | 70 | 45 |
| 4 | 30 | Yes | 5.0 | 1 | A | 4.0 | 25 | 35 |
| 5 | 30 | Yes | 5.0 | 1 | A | 4.0 | 12 | 30 |
| 6 | 45 | Yes | 5.0 | 1 | A | 4.0 | 40 | 38 |
| 7 | 45 | Yes | 5.0 | 1 | A | 4.0 | 38 | 35 |
| 8 | 50 | Yes | 5.0 | 1 | A | 4.0 | 42 | 45 |
| 9 | 45 | Yes | 5.0 | 1 | A | 4.0 | 75 | 55 |
| 10 | 30 | Yes | 5.0 | 1 | A | 4.0 | 11 | 28 |
| 11 | 45 | Yes | 5.0 | 1 | A | 8.0 | 42 | 68 |
| 12 | 45 | Yes | 5.0 | 1 | B | 4.0 | 40 | 51 |
| 13 | 45 | Yes | 5.0 | 1 | A | 4.0 | 38 | 40 |
| 14 | 45 | Yes | 5.0 | 1 | A | 4.0 | 35 | 40 |
| 15 | 45 | Yes | 5.0 | 1 | A | 4.0 | 50 | 40 |
| 16 | 45 | Yes | 5.0 | 1 | A | 4.0 | 42 | 38 |
| 17 | 45 | Yes | 5.0 | 1 | A | 4.0 | 44 | 40 |
| 18 | 45 | No | 5.0 | 1 | A | 4.0 | 68 | 50 |
| 19 | 30 | Yes | 5.0 | 1 | A | 4.0 | 90 | 48 |

In the "Treatment agent" column in Table 1, "A" denotes n-octyltriethoxysilane and "B" denotes isobutyltrimethoxysilane.

<Production Examples of Binder Resins>

(Production Example of Polyester Resin 1)

Polyoxypropylene(2.2)-2,2-bis(4-hydroxyphenyl)propane: 60.8 parts (0.155 moles; 80 mol. % relative to the total number of moles of polyhydric alcohol)

Polyoxyethylene(2.2)-2,2-bis(4-hydroxyphenyl)propane: 13.6 parts (0.039 moles; 20 mol. % relative to the total number of moles of polyhydric alcohol)

Terephthalic acid: 20.8 parts (0.129 moles; 80 mol. % relative to the total number of moles of polycarboxylic acid)

Trimellitic anhydride: 6.6 parts (0.032 moles; 20 mol. % relative to the total number of moles of polycarboxylic acid)

The materials listed above were introduced into a reaction vessel equipped with a condenser tube, a stirrer, a nitrogen inlet tube and a thermocouple.

Next, tin 2-ethylhexanoate as a catalyst (an esterification catalyst) was added in an amount of 1.5 parts relative to 100 parts of the overall monomer amount.

Next, the reaction vessel was purged with nitrogen gas, the temperature was gradually increased while stirring the contents of the reaction vessel, and a reaction was allowed to progress for 2.5 hours while stirring the contents of the reaction vessel at a temperature of 200° C.

Furthermore, the pressure inside the reaction vessel was lowered to 8.3 kPa and held at this pressure for 1 hour, after which the contents of the reaction vessel were cooled to a temperature of 180° C., a reaction was allowed to progress, and once it had been confirmed that the softening point, as measured in accordance with ASTM D36-86, had reached 110° C., the temperature was lowered and the reaction was terminated. The obtained polyester resin 1 had a softening point (Tm) of 100° C. and an acid value of 10 mg KOH/g.

(Production Example of Polyester Resin 2)

Polyoxypropylene(2.2)-2,2-bis(4-hydroxyphenyl)propane:
60.8 parts (0.155 moles; 80 mol. % relative to the total number of moles of polyhydric alcohol)

Polyoxyethylene(2.2)-2,2-bis(4-hydroxyphenyl)propane: 13.6 parts (0.039 moles; 20 mol. % relative to the total number of moles of polyhydric alcohol)

Terephthalic acid: 20.8 parts (0.129 moles; 80 mol. % relative to the total number of moles of polycarboxylic acid)

Trimellitic anhydride: 0.66 parts (0.003 moles; 2 mol. % relative to the total number of moles of polycarboxylic acid)

The materials listed above were introduced into a reaction vessel equipped with a condenser tube, a stirrer, a nitrogen inlet tube and a thermocouple.

Next, tin 2-ethylhexanoate as a catalyst (an esterification catalyst) was added in an amount of 1.0 part relative to 100 parts of the overall monomer amount.

Next, the reaction vessel was purged with nitrogen gas, the temperature was gradually increased while stirring the contents of the reaction vessel, and a reaction was allowed to progress for 2.5 hours while stirring the contents of the reaction vessel at a temperature of 200° C.

Furthermore, the pressure inside the reaction vessel was lowered to 8.3 kPa and held at this pressure for 1 hour, after which the contents of the reaction vessel were cooled to a temperature of 180° C. and the reaction vessel was allowed to return to atmospheric pressure (first reaction step).

Trimellitic anhydride: 5.94 parts (0.029 moles; 18 mol. % relative to the total number of moles of polycarboxylic acid)

Tert-butylcatechol (polymerization inhibitor): 0.1 parts

Next, the materials listed above were added, the pressure inside the reaction vessel was lowered to 8.3 kPa, a reaction was allowed to progress for 15 hours while maintaining a temperature of 160° C., and once it had been confirmed that the softening point, as measured in accordance with ASTM D36-86, had reached 150° C., the temperature was lowered and the reaction was terminated (second reaction step), thereby obtaining polyester resin 2. The obtained polyester resin 2 had a softening point (Tm) of 160° C. and an acid value of 6 mg KOH/g.

(Production Example of Polyester Resin 3)

Polyoxypropylene(2.2)-2,2-bis(4-hydroxyphenyl)propane: 60.4 parts (0.153 moles; 80 mol. % relative to the total number of moles of polyhydric alcohol)

Polyoxyethylene(2.2)-2,2-bis(4-hydroxyphenyl)propane: 13.9 parts (0.038 moles; 20 mol. % relative to the total number of moles of polyhydric alcohol)

Terephthalic acid: 18.6 parts (0.112 moles; 70 mol. % relative to the total number of moles of polycarboxylic acid)

Trimellitic anhydride: 3.4 parts (0.016 moles; 10 mol. % relative to the total number of moles of polycarboxylic acid)

Succinic acid: 3.8 parts (0.032 moles; 20 mol. % relative to the total number of moles of polycarboxylic acid)

The materials listed above were introduced into a reaction vessel equipped with a condenser tube, a stirrer, a nitrogen inlet tube and a thermocouple.

Next, tin 2-ethylhexanoate as a catalyst (an esterification catalyst) was added in an amount of 1.5 parts relative to 100 parts of the overall monomer amount.

Next, the reaction vessel was purged with nitrogen gas, the temperature was gradually increased while stirring the contents of the reaction vessel, and a reaction was allowed to progress for 2.5 hours while stirring the contents of the reaction vessel at a temperature of 200° C.

Furthermore, the pressure inside the reaction vessel was lowered to 8.3 kPa and held at this pressure for 1 hour, after which the contents of the reaction vessel were cooled to a temperature of 180° C., a reaction was allowed to progress, and once it had been confirmed that the softening point, as measured in accordance with ASTM D36-86, had reached 80° C., the temperature was lowered and the reaction was terminated. The obtained polyester resin 3 had a softening point (Tm) of 80° C. and an acid value of 18 mg KOH/g.

(Production Example of Polyester Resin 4)

Polyoxypropylene(2.2)-2,2-bis(4-hydroxyphenyl)propane: 15.5 parts (0.039 moles; 20 mol. % relative to the total number of moles of polyhydric alcohol)

Polyoxyethylene(2.2)-2,2-bis(4-hydroxyphenyl)propane: 57.2 parts (0.158 moles; 80 mol. % relative to the total number of moles of polyhydric alcohol)

Terephthalic acid: 19.1 parts (0.115 moles; 70 mol. % relative to the total number of moles of polycarboxylic acid)

Trimellitic anhydride: 5.2 parts (0.025 moles; 15 mol. % relative to the total number of moles of polycarboxylic acid)

Succinic acid: 2.9 parts (0.025 moles; 15.0 mol. % relative to the total number of moles of polycarboxylic acid)

The materials listed above were introduced into a reaction vessel equipped with a condenser tube, a stirrer, a nitrogen inlet tube and a thermocouple.

Next, tin 2-ethylhexanoate as a catalyst (an esterification catalyst) was added in an amount of 1.5 parts relative to 100 parts of the overall monomer amount.

Next, the flask was purged with nitrogen gas, the temperature was gradually increased while stirring the contents of the flask, and a reaction was allowed to progress for 2.5 hours while stirring the contents of the flask at a temperature of 200° C.

Furthermore, the pressure inside the reaction vessel was lowered to 8.3 kPa and held at this pressure for 1 hour, after which the contents of the reaction vessel were cooled to a temperature of 180° C., a reaction was allowed to progress, and once it had been confirmed that the softening point, as measured in accordance with ASTM D36-86, had reached 70° C., the temperature was lowered and the reaction was terminated. The obtained polyester resin 4 had a softening point (Tm) of 70° C. and an acid value of 35 mg KOH/g.

(Production Example of Polyester Resin 5)
Polyoxypropylene(2.2)-2,2-bis(4-hydroxyphenyl)propane:
  64.7 parts (0.164 moles; 90 mol. % relative to the total number of moles of polyhydric alcohol)
Polyoxyethylene(2.2)-2,2-bis(4-hydroxyphenyl)propane:
  6.6 parts (0.018 moles; 10 mol. % relative to the total number of moles of polyhydric alcohol)
Terephthalic acid: 12.6 parts (0.076 moles; 50 mol. % relative to the total number of moles of polycarboxylic acid)
Trimellitic anhydride: 7.1 parts (0.033 moles; 22 mol. % relative to the total number of moles of polycarboxylic acid)

The materials listed above were introduced into a reaction vessel equipped with a condenser tube, a stirrer, a nitrogen inlet tube and a thermocouple.

Next, tin 2-ethylhexanoate as a catalyst (an esterification catalyst) was added in an amount of 1.0 part relative to 100 parts of the overall monomer amount.

Next, the reaction vessel was purged with nitrogen gas, the temperature was gradually increased while stirring the contents of the reaction vessel, and a reaction was allowed to progress for 2.5 hours while stirring the contents of the reaction vessel at a temperature of 200° C.

Furthermore, the pressure inside the reaction vessel was lowered to 8.3 kPa and held at this pressure for 1 hour, after which the contents of the reaction vessel were cooled to a temperature of 180° C. and the reaction vessel was allowed to return to atmospheric pressure (first reaction step).
Trimellitic anhydride: 9.0 parts (0.042 moles; 28.0 mol. % relative to the total number of moles of polycarboxylic acid)
Tert-butylcatechol (polymerization inhibitor): 0.1 parts Next, the materials listed above were added, the pressure inside the reaction vessel was lowered to 8.3 kPa, a reaction was allowed to progress for 15 hours while maintaining a temperature of 160° C., and once it had been confirmed that the softening point, as measured in accordance with ASTM D36-86, had reached 170° C., the temperature was lowered and the reaction was terminated (second reaction step), thereby obtaining polyester resin 5. The obtained polyester resin 5 had a softening point (Tm) of 175° C. and an acid value of 10 mg KOH/g.

(Production Example of Polyester Resin H1)
Polyoxypropylene(2.2)-2,2-bis(4-hydroxyphenyl)propane:
  73.4 parts (0.186 moles; 100.0 mol. % relative to the total number of moles of polyhydric alcohol)
Terephthalic acid: 21.6 parts (0.130 moles; 82 mol. % relative to the total number of moles of polycarboxylic acid)
Adipic acid: 2.3 parts (0.016 moles; 10 mol. % relative to the total number of moles of polycarboxylic acid)
Tin (II) di(2-ethylhexanoate): 0.8 parts The materials listed above were weighed out and introduced into a reaction vessel equipped with a condenser tube, a stirrer, a nitrogen inlet tube and a thermocouple. Next, the flask was purged with nitrogen gas, the temperature was gradually increased while stirring the contents of the flask, and a reaction was allowed to progress for 2 hours while stirring the contents of the flask at a temperature of 200° C.

Furthermore, the pressure inside the reaction vessel was lowered to 8.3 kPa and held at this pressure for 1 hour, after which the contents of the reaction vessel were cooled to a temperature of 180° C. and the reaction vessel was allowed to return to atmospheric pressure (first reaction step).
Trimellitic anhydride: 2.7 parts (0.013 moles; 8 mol. % relative to the total number of moles of polycarboxylic acid)
Tert-butylcatechol (polymerization inhibitor): 0.1 parts by mass Next, the materials listed above were added, the pressure inside the reaction vessel was lowered to 8.3 kPa, a reaction was allowed to progress for 12 hours while maintaining a temperature of 160° C., and the temperature was lowered so as to terminate the reaction (second reaction step), thereby obtaining polyester resin H1. The obtained polyester resin H1 had a softening point (Tm) of 140° C. and an acid value of 25 mg KOH/g.

<Production Example of Toner 1>
Polyester resin 1: 80.0 parts
Polyester resin H1: 20.0 parts
Aluminum 3,5-di-t-butylsalicylate compound: 0.1 parts
Fischer Tropsch wax (melting point: 90° C.): 5.0 parts
C. I. Pigment Blue 15:3:5.0 parts Using a HENSCHEL MIXER (FM75J model, available from Mitsui Miike Chemical Engineering Machinery, Co., Ltd.), the raw materials shown in the formulation were mixed at a rotational speed of 20 $s^{-1}$ for a period of 5 minutes, and then kneaded using a twin screw kneader (PCM-30 model, available from Ikegai Corporation) at a temperature of 130° C. and a barrel rotation speed of 200 rpm.

The obtained kneaded product was cooled and then coarsely pulverized to a size of not more than 1 mm using a hammer mill so as to obtain a coarsely pulverized product. The obtained coarsely pulverized product was then finely pulverized using a mechanical pulverizer (T-250, available from Turbo Kogyo Co., Ltd.). Toner particles 1 were then obtained by classifying the finely pulverized product using a rotating classifier (200TSP, available from Hosokawa Micron Corporation). The rotating classifier (200TSP, available from Hosokawa Micron Corporation) was operated at a classifying rotor rotational speed of 50.0 $s^{-1}$. The obtained toner particles 1 had a weight-average particle diameter (D4) of 6.4 μm.

1.0 part of hydrophobic silica fine particles having a number average primary particle diameter of 15 nm and surface treated with 20.0 mass % of hexamethyldisilazane and 1.0 part of metal titanate particles 1 were added to 100.0 parts of the obtained toner particles 1. A toner 1 was obtained by mixing the obtained addition product using a HENSCHEL MIXER (FM75J model, available from Mitsui Miike Chemical Engineering Machinery, Co., Ltd.) at a rotational speed of 30 s$^{-1}$ for 5 minutes, and then passing the addition product through an ultrasonic vibration sieve having an opening size of 54 μm.

<Production Examples of Toners 2 to 10, 15 to 21 and 23 and 24>

Toners 2 to 10, 15 to 21 and 23 and 24 were obtained in a similar way, except that the metal titanate particles 1 used in the production example of toner 1 were replaced with the particles shown in Table 2.

<Production Example of Toner 11>

Toner particles 2 were produced in a similar way, except that polyester resin 1 used in the production example of toner 1 was replaced with polyester resin 2. In addition, toner 11 was obtained in a similar way to that used in the production example of toner 1, except that toner particles 2 were used.

<Production Example of Toner 12>

Toner particles 3 were produced in a similar way, except that polyester resin 1 used in the production example of toner 1 was replaced with polyester resin 3. In addition, toner 12 was obtained in a similar way to that used in the production example of toner 1, except that toner particles 3 were used.

<Production Example of Toner 13>

710 parts of ion exchanged water and 850 parts of a 0.1 mol/L aqueous solution of $Na_3PO_4$ were added to a four mouthed vessel, and the vessel was held at a temperature of 60° C. while the contents of the vessel were stirred at a speed of 12,000 rpm using a high-speed stirrer (T.K. Homomixer available from Tokushu Kika Kogyo Co., Ltd.). 68 parts of a 1.0 mol/L aqueous solution of $CaCl_2$ was then added gradually, thereby preparing an aqueous dispersion medium containing an ultrafine poorly water-soluble dispersion stabilizer ($Ca_3(PO_4)_2$).

Styrene: 122.0 parts
n-butyl acrylate: 36.0 parts
Copper phthalocyanine pigment (Pigment Blue 15:3): 13.0 parts
Aluminum 3,5-di-t-butylsalicylate compound: 0.8 parts
Fischer Tropsch wax (melting point: 78° C.): 15.0 parts A monomer mixture was prepared by stirring the materials listed above for 3 hours using an Attritor (available from Nippon Coke & Engineering Co., Ltd.) and dispersing the components in a polymerizable monomer.

A polymerizable monomer composition was prepared by adding 20.0 parts (of a 50% toluene solution) of 1,1,3,3-tetramethylbutylperoxy-2-ethyl hexanoate, which is a polymerization initiator, to the monomer mixture.

The polymerizable monomer composition was introduced into an aqueous dispersion medium, and granulation was carried out for 5 minutes while maintaining the rotational speed of the stirrer at 10,000 rpm. The high-speed stirrer was then replaced with a propeller type stirrer, the internal temperature was increased to 70° C., and a reaction was allowed to progress for 6 hours under gentle stirring.

Next, the temperature inside the vessel was increased to 80° C. and maintained for 4 hours, after which a slurry was obtained by cooling gradually to 30° C. at a cooling rate of 1° C./min.

Dilute hydrochloric acid was added to the vessel containing the slurry, and the dispersion stabilizer was removed.

Toner particles 4 having a weight-average particle diameter (D4) of 6.5 μm were obtained by filtering, washing and drying.

1.0 part of hydrophobic silica fine particles having a number average primary particle diameter of 15 nm and surface treated with 20.0 mass % of hexamethyldisilazane and 1.0 part of metal titanate particles 1 were added to 100.0 parts of the obtained toner particles 4. A toner 13 was obtained by mixing the obtained addition product using a HENSCHEL MIXER (FM75J model, available from Mitsui Miike Chemical Engineering Machinery, Co., Ltd.) at a rotational speed of 30 s$^{-1}$ for 5 minutes, and then passing the addition product through an ultrasonic vibration sieve having an opening size of 54 μm.

<Production Example of Toner 14>

(Preparation of Dispersion Liquid of Polyester Resin 1)

A dispersion liquid of polyester resin 1 (solid content: 20 mass %) was obtained by adjusting 100.0 parts of polyester resin 1 and 400.0 parts of ion exchanged water to a pH of 8.5 by means of ammonia, and then operating a Cavitron (available from Eurotec) under heating conditions of 150° C.

(Preparation of Dispersion Liquid of Polyester Resin H1)

A dispersion liquid of polyester resin H1 (solid content: 20 mass %) was obtained by adjusting 100.0 parts of polyester resin H1 and 400.0 parts of ion exchanged water to a pH of 8.5 by means of ammonia, and then operating a Cavitron (available from Eurotec) under heating conditions of 150° C.

(Preparation of Colorant-Dispersed Solution)

C. I. Pigment Blue 15:3:1000 parts
Anionic surfactant (Neogen RK available from DKS Co., Ltd.): 150 parts
Ion exchanged water: 9000 parts The materials listed above were mixed and dissolved, and then dispersed using a Nanomizer high pressure impact disperser (available from Yoshida Kikai Co., Ltd.).

Colorant particles in the obtained colorant-dispersed solution had a volume average particle diameter D50 of 0.16 μm and a colorant concentration of 23 mass %.

(Preparation of Wax Dispersion Liquid)

Fischer Tropsch wax (Melting point: 90° C.): 40 parts
Anionic surfactant (Neogen RK available from DKS Co., Ltd.): 5 parts
Ion exchanged water: 155 parts A wax dispersion liquid (wax concentration: 20 mass %) in which a wax having a volume average particle diameter D50 of 210 nm was dispersed was prepared by heating the materials listed above to a temperature of 95° C., dispersing using a homogenizer (Ultratarax T50 available from IKA), and then carrying out a dispersion treatment using a pressure discharge-type Gaulin homogenizer (available from Meiwa Shoji Co., Ltd.).

Dispersion liquid of polyester resin 1: 500 parts

The material above was mixed and dispersed in a round stainless steel flask using a homogenizer (Ultratarax T50 available from IKA). 0.15 parts of polyaluminum chloride were added to the flask, and the dispersion operation was continued using the homogenizer (Ultratarax T50 available from IKA).

Next,
Colorant-dispersed solution: 30.5 parts
Wax dispersion liquid: 25 parts

The materials listed above were added, 0.05 parts of polyaluminum chloride was added to the flask, and the dispersion operation was continued using the homogenizer (Ultratarax T50 available from IKA).

Next, a stirrer and mantle heater were attached to the round stainless steel flask, and the temperature was increased to 60° C. and held at 60° C. for 15 minutes while adjusting the rotational speed of the stirrer so that the slurry was sufficiently stirred. Next, the particle diameter was measured every 10 minutes using a Coulter Multisizer II (aperture diameter: 50 μm, available from Beckman Coulter, Inc.) while increasing the temperature at a rate of 0.05° C./min. When the volume average particle diameter of the obtained resin particles reached 5.0 μm, 75 parts of a dispersion liquid of polyester resin 2 (an additional resin) (the preparation method of which was the same, except that polyester resin 1 used to prepare the dispersion liquid of polyester resin 1 was replaced with polyester resin 2) was introduced over a period of 3 minutes.

After being held for 30 minutes following the introduction, the pH was adjusted to 9.0 using a 5% aqueous solution of sodium hydroxide. Next, the temperature was increased to 96° C. at a ramp rate of 1° C./min while adjusting the pH to 9.0 every 5° C., and the temperature was then held at 96° C. When the shape and surface characteristics of the particles were observed every 30 minutes using an optical microscope and a scanning electron microscope (FE-SEM), the particles were spherical at the 5th hour, and the resin particles were solidified by lowering the temperature to 20° C. at a rate of 1° C./min.

Next, toner particles 5 having a weight-average particle diameter (D4) of 6.5 μm were obtained by filtering the reaction product, washing thoroughly with ion exchanged water and then drying using a vacuum dryer.

1.0 part of hydrophobic silica fine particles having a number average primary particle diameter of 15 nm and surface treated with 20.0 mass % of hexamethyldisilazane and 1.0 part of metal titanate particles 1 were added to 100.0 parts of the obtained toner particles 5. A toner 14 was obtained by mixing the obtained addition product using a HENSCHEL MIXER (FM75J model, available from Mitsui Miike Chemical Engineering Machinery, Co., Ltd.) at a rotational speed of 30 s$^{-1}$ for 5 minutes, and then passing the addition product through an ultrasonic vibration sieve having an opening size of 54 μm.

<Production Example of Toner 22>

Toner 22 was obtained in a similar way, except that the added amount of the metal titanate particles 1 used in the production example of toner 1 was changed to 0.2 parts.

<Production Example of Toner 25>

Toner particles 6 were produced in a similar way, except that polyester resin 1 used in the production example of toner 1 was replaced with polyester resin 4. In addition, toner 25 was obtained in a similar way to that used in the production example of toner 1, except that toner particles 6 were used.

<Production Example of Toner 26>

Toner particles 7 were produced in a similar way, except that polyester resin 1 used in the production example of toner 1 was replaced with polyester resin 5. In addition, toner 26 was obtained in a similar way to that used in the production example of toner 1, except that toner particles 7 were used.

Moreover, the physical properties of toners 1 to 26 are shown in Table 2.

TABLE 2

Physical properties of metal titanate particles on surface of toner particles

| Toner No. | Toner particle No. | Metal titanate particle No. | Particle diameter (nm) (number-based) D90 | D50 | D10 | Particle size distribution index A D90/D10 | Particle size distribution index B D90/D50 | Circularity distribution of metal titanate particles Average circularity | Proportion of particles having circularity of at least 0.90 | Proportion of particles having circularity of not more than 0.60 | Coverage ratio | Storage elastic modulus G' (Pa) | Peak temperature of loss tangent (° C.) |
|---|---|---|---|---|---|---|---|---|---|---|---|---|---|
| 1 | 1 | 1 | 95 | 55 | 38 | 2.50 | 1.73 | 0.750 | 2% | 6% | 15% | $1.0 \times 10^9$ | 67.0 |
| 2 | 1 | 2 | 120 | 70 | 48 | 2.50 | 1.71 | 0.750 | 2% | 6% | 12% | $1.0 \times 10^9$ | 67.0 |
| 3 | 1 | 3 | 145 | 85 | 54 | 2.70 | 1.71 | 0.770 | 2% | 6% | 6% | $9.0 \times 10^8$ | 67.0 |
| 4 | 1 | 4 | 50 | 30 | 20 | 2.50 | 1.67 | 0.800 | 3% | 4% | 20% | $1.0 \times 10^9$ | 67.0 |
| 5 | 1 | 5 | 25 | 15 | 11 | 2.30 | 1.67 | 0.830 | 8% | 2% | 30% | $1.5 \times 10^9$ | 67.0 |
| 6 | 1 | 6 | 120 | 50 | 20 | 6.00 | 2.40 | 0.750 | 4% | 8% | 16% | $1.0 \times 10^9$ | 67.0 |
| 7 | 1 | 7 | 145 | 45 | 18 | 8.00 | 3.22 | 0.760 | 6% | 9% | 18% | $1.0 \times 10^9$ | 67.0 |
| 8 | 1 | 8 | 70 | 48 | 33 | 2.10 | 1.46 | 0.780 | 3% | 5% | 14% | $1.0 \times 10^9$ | 67.0 |
| 9 | 1 | 9 | 130 | 88 | 62 | 2.10 | 1.48 | 0.770 | 5% | 3% | 4% | $1.0 \times 10^9$ | 67.0 |
| 10 | 1 | 10 | 23 | 15 | 11 | 2.10 | 1.53 | 0.820 | 10% | 1% | 25% | $2.0 \times 10^9$ | 67.0 |
| 11 | 2 | 1 | 95 | 55 | 38 | 2.50 | 1.73 | 0.750 | 2% | 6% | 15% | $8.0 \times 10^9$ | 82.0 |
| 12 | 3 | 1 | 95 | 55 | 38 | 2.50 | 1.73 | 0.750 | 2% | 6% | 15% | $2.0 \times 10^7$ | 52.0 |
| 13 | 4 | 1 | 95 | 55 | 38 | 2.50 | 1.73 | 0.750 | 2% | 6% | 16% | $5.0 \times 10^9$ | 75.0 |
| 14 | 5 | 1 | 95 | 55 | 38 | 2.50 | 1.73 | 0.750 | 2% | 6% | 14% | $2.0 \times 10^9$ | 70.0 |
| 15 | 1 | 11 | 95 | 55 | 40 | 2.40 | 1.73 | 0.760 | 3% | 6% | 15% | $1.2 \times 10^9$ | 67.0 |
| 16 | 1 | 12 | 95 | 55 | 35 | 2.70 | 1.73 | 0.760 | 5% | 6% | 15% | $9.0 \times 10^8$ | 67.0 |
| 17 | 1 | 13 | 90 | 50 | 33 | 2.70 | 1.80 | 0.760 | 2% | 6% | 15% | $8.0 \times 10^8$ | 67.0 |
| 18 | 1 | 14 | 82 | 45 | 33 | 2.50 | 1.82 | 0.750 | 3% | 7% | 15% | $8.0 \times 10^8$ | 67.0 |
| 19 | 1 | 15 | 108 | 65 | 43 | 2.50 | 1.66 | 0.770 | 7% | 7% | 13% | $1.5 \times 10^9$ | 67.0 |
| 20 | 1 | 16 | 270 | 50 | 36 | 7.50 | 5.40 | 0.800 | 12% | 2% | 17% | $1.0 \times 10^9$ | 67.0 |
| 21 | 1 | 17 | 65 | 50 | 28 | 2.30 | 1.30 | 0.790 | 8% | 6% | 13% | $1.0 \times 10^9$ | 67.0 |
| 22 | 1 | 1 | 95 | 55 | 38 | 2.50 | 1.73 | 0.750 | 2% | 6% | 2% | $1.0 \times 10^9$ | 67.0 |
| 23 | 1 | 18 | 75 | 45 | 63 | 1.20 | 1.67 | 0.800 | 4% | 4% | 12% | $1.0 \times 10^9$ | 67.0 |
| 24 | 1 | 19 | 100 | 60 | 7 | 15.00 | 1.67 | 0.720 | 9% | 6% | 22% | $1.0 \times 10^9$ | 67.0 |
| 25 | 6 | 1 | 95 | 55 | 38 | 2.50 | 1.73 | 0.750 | 2% | 6% | 15% | $7.0 \times 10^6$ | 48.0 |
| 26 | 7 | 1 | 95 | 55 | 38 | 2.50 | 1.73 | 0.750 | 2% | 6% | 15% | $2.0 \times 10^{10}$ | 92.0 |

Two-component developers 1 to 26 were obtained by mixing toners 1 to 26 and magnetic ferrite carrier particles (having a number average particle diameter of 35 μm), which had been surface coated with a silicone resin, for 5 minutes at a rate of 0.5 s$^{-1}$ using a V type mixer (V-10 type, available from Tokuju Corporation) so that the toner concentration was 9 mass %.

Example 1

The following evaluations were carried out using an imagePRESS C800 full-color copier available from Canon Inc. or a modified version thereof.

This image forming apparatus has a photoreceptor that forms an electrostatic latent image as an image bearing member, and has a developing step in which an electrostatic latent image of a photoreceptor is developed as a toner image by means of a two-component developer.

Furthermore, this image forming apparatus has a transfer step, in which the developed toner image is transferred to an intermediate transfer member and the toner image on the intermediate transfer member is transferred to a paper, and a fixing step in which the toner image on the paper is fixed by means of heat.

A two-component developer 1 was introduced into a cyan station developing device in the image forming apparatus, and the following evaluations were then carried out.

<Evaluation of Low Temperature Fixability>

In an environment at normal temperature and normal humidity (a temperature of 23° C. and a relative humidity of at least 50% and not more than 60%), an unfixed image was prepared in single color mode by adjusting the toner mounting amount on the paper to 1.2 mg/cm$^2$. GF-0081 copier paper (A4, basis weight 81.4 g/m$^2$, sold by Canon Marketing Japan Inc.) was used as the evaluation paper, and an image was formed at an image print coverage rate of 35%.

Next, in an environment having a low temperature and low humidity (a temperature of 15° C. and a relative humidity of not more than 10%), the unfixed image was fixed by setting the process speed to 450 mm/sec and increasing the fixing temperature from 120° C. at intervals of 5° C., and the minimum temperature at which offset did not occur was deemed to be the low temperature fixing temperature. The evaluation results are shown in Table 3.
(Evaluation Criteria)
A: Lower than 160° C. (excellent)
B: At least 160° C. and lower than 180° C. (advantageous effect achieved)
C: At least 180° C. (advantageous effect not achieved)

<Evaluation of Charging Performance and Transferability>

A modified version of the image forming apparatus mentioned above was used. The modification was that the mechanism for discharging excess magnetic carrier in the developing device from the developing device was removed.

Adjustments were made so that the toner mounting amount on a paper for an FFh image (a solid image) was 0.45 mg/cm$^2$. FFh is a value that indicates 256 colors as 16 binary numbers, with 00h denoting the first gradation of 256 colors (a white background part), and FFh denoting the 256th of 256 colors (a solid part).

In these evaluations, the image ratio was 1%, and a long-term image output test was conducted by printing 10,000 prints. The test environments were a normal temperature normal humidity (NN) environment (a temperature of 23° C. and a relative humidity of at least 50% and not more than 60%), a normal temperature low humidity (NL) environment (a temperature of 23° C. and a relative humidity of 5%) and a high temperature high humidity (HH) environment (a temperature of 32° C. and a relative humidity of 80%).

While continuously feeding 10,000 sheets of paper, paper feeding was carried out under the same developing conditions and transfer conditions (no calibration) as those used when printing 1 print. GF-0081 ordinary copier paper (A4, basis weight 81.4 g/m$^2$, sold by Canon Marketing Japan Inc.) was used as the evaluation paper.

Evaluation items and evaluation criteria are as follows for initial image formation (first print) and image formation after continuously feeding 10,000 sheets of paper. In addition, the evaluation results are shown in Table 3.
(Evaluation of Image Density)

Using an X-Rite color reflection densitometer (500 Series available from X-Rite Inc.), the image density of FFh parts (solid parts) in an initial image (a first print) and after long term use (a 10,000th print) was measured, and the absolute value in the difference in image density between the two images was ranked according to the following criteria. In Table 3, initial density is denoted by "α", density after long term use is denoted by "β", and the absolute value in the difference in image density between the two images is denoted by "γ".
A: Less than 0.05 (extremely excellent)
B: At least 0.05 and less than 0.10 (good)
C: At least 0.10 and less than 0.15 (advantageous effect achieved)
D: At least 0.15 (advantageous effect not achieved)
(Evaluation of Image Uniformity)

After long term output of the 10,000 prints mentioned above, FFh images (solid images) were outputted, images measuring 2 cm on each side were captured using a digital microscope, the captured images were converted into 8 bit gray scale using Image-J (developer: Wayne Rasband (NIH)), density histograms were measured, and the standard deviation thereof was determined. These standard deviation values were ranked according to the following evaluation criteria.
A: Standard deviation less than 2.0 (extremely excellent)
B: Standard deviation at least 2.0 and less than 4.0 (somewhat excellent)
C: Standard deviation at least 4.0 and less than 6.0 (advantageous effect achieved)
D: Standard deviation at least 6.0 (sense of non-uniformity when viewed from afar)

<Evaluation of Environmental Stability>

The degree of change in image density in a HH environment and NL environment relative to the image density in the NN environment were used as evaluation criteria for environmental stability.

For an initial print (a first print), if the image density in a NN environment is denoted by DNNi, the image density in a HH environment is denoted by DHHi and the image density in a NL environment is denoted by DNLi, the degree of environmental change in initial image density Vi was determined using the following equation.

$$Vi(\%)=\{(DHHi-DNLi)/DNNi\}\times 100$$

Similarly, for a print following long term output (a 10,000th print), if the image density in a NN environment is denoted by DNNf, the image density in a HH environment is denoted by DHHf and the image density in a NL environment is denoted by DNLf, the degree of environmental change in image density after long time use Vf was determined using the following equation.

$$Vf(\%)=\{(DHHf-DNLf)/DNNf\}\times 100$$

These Vi and Vf values were ranked according to the following evaluation criteria.
A: Less than 35% (extremely excellent)
B: At least 35% and less than 50% (excellent)
C: At least 50% and less than 60% (advantageous effect achieved)
D: At least 60% (advantageous effect not achieved)

TABLE 3

| Example/Comparative example No. | Two-component developer No. | Low-temperature fixability (°C.) | NN Environment α | NN Environment β | NN Environment γ | NN Environment Image uniformity | NL Environment α | NL Environment β | NL Environment γ | NL Environment Image uniformity | HH Environment α | HH Environment β | HH Environment γ | HH Environment Image uniformity | Environmental stability Vi | | Environmental stability Vf | |
|---|---|---|---|---|---|---|---|---|---|---|---|---|---|---|---|---|---|---|
| 1 | 1 | 155 A | 1.40 | 1.38 | A | A | 1.25 | 1.22 | A | A | 1.65 | 1.68 | A | A | 29% | A | 33% | A |
| 2 | 2 | 155 A | 1.40 | 1.36 | A | A | 1.22 | 1.14 | B | A | 1.65 | 1.69 | A | A | 31% | A | 40% | B |
| 3 | 3 | 155 A | 1.40 | 1.35 | B | A | 1.18 | 1.06 | C | A | 1.68 | 1.75 | B | A | 36% | B | 51% | C |
| 4 | 4 | 155 A | 1.40 | 1.37 | A | A | 1.25 | 1.21 | A | A | 1.65 | 1.68 | A | A | 29% | A | 34% | A |
| 5 | 5 | 155 A | 1.40 | 1.37 | A | A | 1.25 | 1.21 | A | A | 1.65 | 1.69 | A | A | 29% | A | 35% | B |
| 6 | 6 | 155 A | 1.40 | 1.38 | A | A | 1.25 | 1.19 | B | B | 1.70 | 1.76 | B | A | 32% | A | 41% | B |
| 7 | 7 | 155 A | 1.40 | 1.38 | A | A | 1.25 | 1.16 | B | B | 1.70 | 1.78 | B | B | 32% | A | 45% | B |
| 8 | 8 | 155 A | 1.40 | 1.32 | B | B | 1.25 | 1.13 | C | C | 1.65 | 1.76 | C | B | 29% | A | 48% | B |
| 9 | 9 | 155 A | 1.40 | 1.33 | B | B | 1.18 | 1.07 | C | C | 1.68 | 1.78 | C | B | 36% | B | 53% | C |
| 10 | 10 | 155 A | 1.40 | 1.32 | B | B | 1.25 | 1.13 | C | C | 1.65 | 1.76 | C | B | 29% | A | 48% | B |
| 11 | 11 | 170 B | 1.40 | 1.38 | A | A | 1.25 | 1.22 | A | A | 1.65 | 1.68 | A | A | 29% | A | 33% | A |
| 12 | 12 | 145 A | 1.40 | 1.34 | B | B | 1.25 | 1.17 | B | C | 1.65 | 1.73 | B | C | 29% | A | 42% | B |
| 13 | 13 | 155 A | 1.40 | 1.37 | A | A | 1.25 | 1.21 | A | B | 1.62 | 1.69 | B | B | 26% | A | 35% | B |
| 14 | 14 | 155 A | 1.40 | 1.38 | A | A | 1.25 | 1.22 | A | A | 1.62 | 1.67 | B | A | 26% | A | 33% | A |
| 15 | 15 | 155 A | 1.40 | 1.38 | A | A | 1.25 | 1.23 | A | A | 1.62 | 1.64 | A | A | 26% | A | 30% | A |
| 16 | 16 | 155 A | 1.40 | 1.38 | A | A | 1.25 | 1.22 | A | A | 1.66 | 1.69 | A | A | 29% | A | 34% | A |
| 17 | 17 | 155 A | 1.40 | 1.38 | A | B | 1.25 | 1.22 | A | B | 1.65 | 1.67 | A | B | 29% | A | 33% | A |
| 18 | 18 | 155 A | 1.40 | 1.38 | A | B | 1.25 | 1.22 | A | B | 1.65 | 1.67 | A | A | 29% | A | 33% | A |
| 19 | 19 | 155 A | 1.40 | 1.36 | A | B | 1.20 | 1.08 | C | C | 1.68 | 1.78 | C | C | 34% | A | 51% | C |
| 20 | 20 | 155 A | 1.40 | 1.38 | A | A | 1.25 | 1.13 | C | B | 1.70 | 1.80 | C | B | 32% | A | 49% | B |
| 21 | 21 | 155 A | 1.40 | 1.30 | C | B | 1.25 | 1.13 | C | C | 1.65 | 1.76 | C | B | 29% | A | 48% | B |
| 22 | 22 | 155 A | 1.40 | 1.38 | A | A | 1.20 | 1.10 | C | B | 1.70 | 1.76 | B | C | 36% | B | 48% | B |
| Comparative 1 | 23 | 155 A | 1.40 | 1.28 | C | C | 1.25 | 1.03 | D | D | 1.70 | 1.86 | D | C | 32% | A | 65% | D |
| Comparative 2 | 24 | 155 A | 1.40 | 1.37 | A | B | 1.15 | 0.99 | D | C | 1.75 | 1.85 | C | C | 43% | B | 63% | D |
| Comparative 3 | 25 | 140 A | 1.40 | 1.32 | B | B | 1.25 | 1.10 | D | D | 1.70 | 1.80 | C | D | 32% | A | 53% | C |
| Comparative 4 | 26 | 185 C | 1.40 | 1.38 | A | A | 1.25 | 1.23 | A | A | 1.65 | 1.67 | A | A | 29% | A | 32% | A |

Examples 2 to 22, Comparative Examples 1 to 4

Evaluations were carried out in a similar way, except that two-component developer 1 used in Example 1 was replaced with two-component developers 2 to 26. The results are shown in Table 3.

According to the present invention, it is possible to provide a toner which exhibits excellent low-temperature fixability, which undergoes little decrease in terms of image density and image uniformity even when printing images having low print coverage rates for long periods of time, and which exhibits excellent environmental stability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-035985, filed Feb. 28, 2017, which is hereby incorporated by reference herein in its entirety.

What is claimed is:

1. A toner containing toner particles and metal titanate particles, at least some of the metal titanate particles being present on a surface of a toner particle, wherein
the value of storage elastic modulus G' at 40° C. in viscoelasticity measurements of the toner is $1.0 \times 10^7$ to $1.0 \times 10^{10}$ Pa, and
the particle size distribution index A represented by a ratio of D90 to D10 (D90/D10) is 2.00 to 5.00, and D50 is 10 to 90 nm in a number-based particle size distribution of metal titanate particle particles on the surface of the toner particle
where D10 denotes the particle diameter at which the cumulative value from the small particle diameter side reaches 10% by number,
D50 denotes the particle diameter at which the cumulative value from the small particle diameter side reaches 50% by number, and
D90 denotes the particle diameter at which the cumulative value from the small particle diameter side reaches 90% by number.

2. The toner according to claim 1, wherein the metal titanate particle is at least one type selected from the group consisting of a magnesium titanate particle, a calcium titanate particle and a strontium titanate particle.

3. The toner according to claim 1, wherein the metal titanate particle has a perovskite crystal structure.

4. The toner according to claim 1, wherein the particle size distribution index B represented by a ratio of D90 to D50 (D90/D50) is 1.50 to 5.00.

5. The toner according to claim 1, wherein the average circularity of metal titanate particles on the surface of the toner particle is 0.650 to 0.900.

6. The toner according to claim 1, wherein in the circularity distribution of metal titanate particles on the surface of the toner particle, the proportion of particles having a circularity of at least 0.90 is not more than 15%, and the proportion of particles having a circularity of not more than 0.60 is not more than 10%.

7. The toner according to claim 1, wherein the coverage ratio of the surface of the toner particles by the metal titanate particle is at least 2%.

8. The toner according to claim 1, wherein in a wettability test on the metal titanate particles relative to a mixed methanol/water solvent, hydrophobicity is 20 to 80 vol. %, where hydrophobicity is represented by an intermediate methanol concentration between a point at which the transmittance of light having a wavelength of 780 nm starts to decrease and a point at which the transmittance of light having a wavelength of 780 nm stops decreasing.

9. The toner according to claim 1, wherein the loss tangent in viscoelasticity measurements of the toner has a peak within a range of 40.0 to 80.0° C.

10. The toner according to claim 1, wherein particle size distribution index A is 2.20 to 3.00.

11. The toner according to claim 1, wherein a content of the metal titanate particle is 0.1 to 10.0 parts by mass relative to 100 parts by mass of the toner particles.

12. The toner according to claim 1, wherein a content of the metal titanate particle is 0.2 to 3.0 parts by mass relative to 100 parts by mass of the toner particles.

13. The toner according to claim 1, wherein the coverage ratio of the surface of the toner particles by the metal titanate particle is 2 to 40%.

* * * * *